United States Patent
Hwang et al.

(10) Patent No.: US 9,559,734 B2
(45) Date of Patent: Jan. 31, 2017

(54) ROBUST COEFFICIENT COMPUTATION FOR ANALOG INTERFERENCE CANCELLATION

(71) Applicant: QUALCOMM Incorporated, San Diego, CA (US)

(72) Inventors: Insoo Hwang, San Diego, CA (US); Bongyong Song, San Diego, CA (US); Huey Trando, San Diego, CA (US); Osvaldo Alcala, Chula Vista, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/658,047

(22) Filed: Mar. 13, 2015

(65) Prior Publication Data

US 2016/0269061 A1    Sep. 15, 2016

(51) Int. Cl.
| | | |
|---|---|---|
| *H04B 1/10* | (2006.01) | |
| *H04W 28/04* | (2009.01) | |
| *H04B 17/318* | (2015.01) | |
| *H04B 17/345* | (2015.01) | |
| *H04B 1/525* | (2015.01) | |
| *H04J 11/00* | (2006.01) | |

(52) U.S. Cl.
CPC ............ *H04B 1/1036* (2013.01); *H04B 1/525* (2013.01); *H04B 17/318* (2015.01); *H04B 17/345* (2015.01); *H04J 11/004* (2013.01); *H04W 28/048* (2013.01); *H04B 2001/1063* (2013.01)

(58) Field of Classification Search
CPC ........... H04L 25/03038; H04L 27/2647; H04L 2025/03414; H04L 25/03057; H04L 25/061; H04L 25/062; H04L 25/063; H04L 25/06; H04B 1/1036; H04B 1/30
USPC ................................ 375/350, 316, 295, 219
See application file for complete search history.

(56) References Cited

U.S. PATENT DOCUMENTS

| | | | |
|---|---|---|---|
| 6,862,315 B1 | 3/2005 | Garg et al. | |
| 7,436,881 B2 | 10/2008 | Nedic et al. | |
| 8,401,132 B2 | 3/2013 | Kolze et al. | |
| 8,433,016 B2 | 4/2013 | Vrcelj et al. | |
| 8,755,756 B1 | 6/2014 | Zhang et al. | |

(Continued)

OTHER PUBLICATIONS

International Search Report and Written Opinion—PCT/US2016/021019—ISA/EPO—Jun. 7, 2016.

*Primary Examiner* — Zewdu Kassa
(74) *Attorney, Agent, or Firm* — Loza & Loza LLP

(57) ABSTRACT

Aspects of the disclosure are directed to interference cancellation. A method of performing interference cancellation in a wireless device having a receiver, a coefficient controller and an analog interference cancellation (AIC) circuit includes utilizing the receiver to receive a signal; utilizing the coefficient controller to compute a first cost function value using a first set of coefficients, to compute a second set of coefficients using a first coefficient control algorithm, to compute a second cost function value using the second set of coefficients, to compare the second cost function value with the first cost function value, and to determine whether to apply the first set or the second set of coefficients based on the comparison; and utilizing the AIC circuit to apply the first or second set of coefficients to filter a reference signal and the receiver to subtract the filtered reference signal from the received signal for interference cancellation.

30 Claims, 18 Drawing Sheets

(56) References Cited

U.S. PATENT DOCUMENTS

| | | |
|---|---|---|
| 8,792,598 B1 | 7/2014 | Cendrillon et al. |
| 2004/0202266 A1 | 10/2004 | Gregorius et al. |
| 2008/0089397 A1 | 4/2008 | Vetter et al. |
| 2013/0301688 A1 | 11/2013 | Khandani |
| 2014/0307569 A1 | 10/2014 | Barbieri et al. |
| 2014/0348018 A1* | 11/2014 | Bharadia ............... H04L 5/1461 370/252 |
| 2015/0311985 A1* | 10/2015 | Kim ....................... H04B 15/00 455/501 |

* cited by examiner

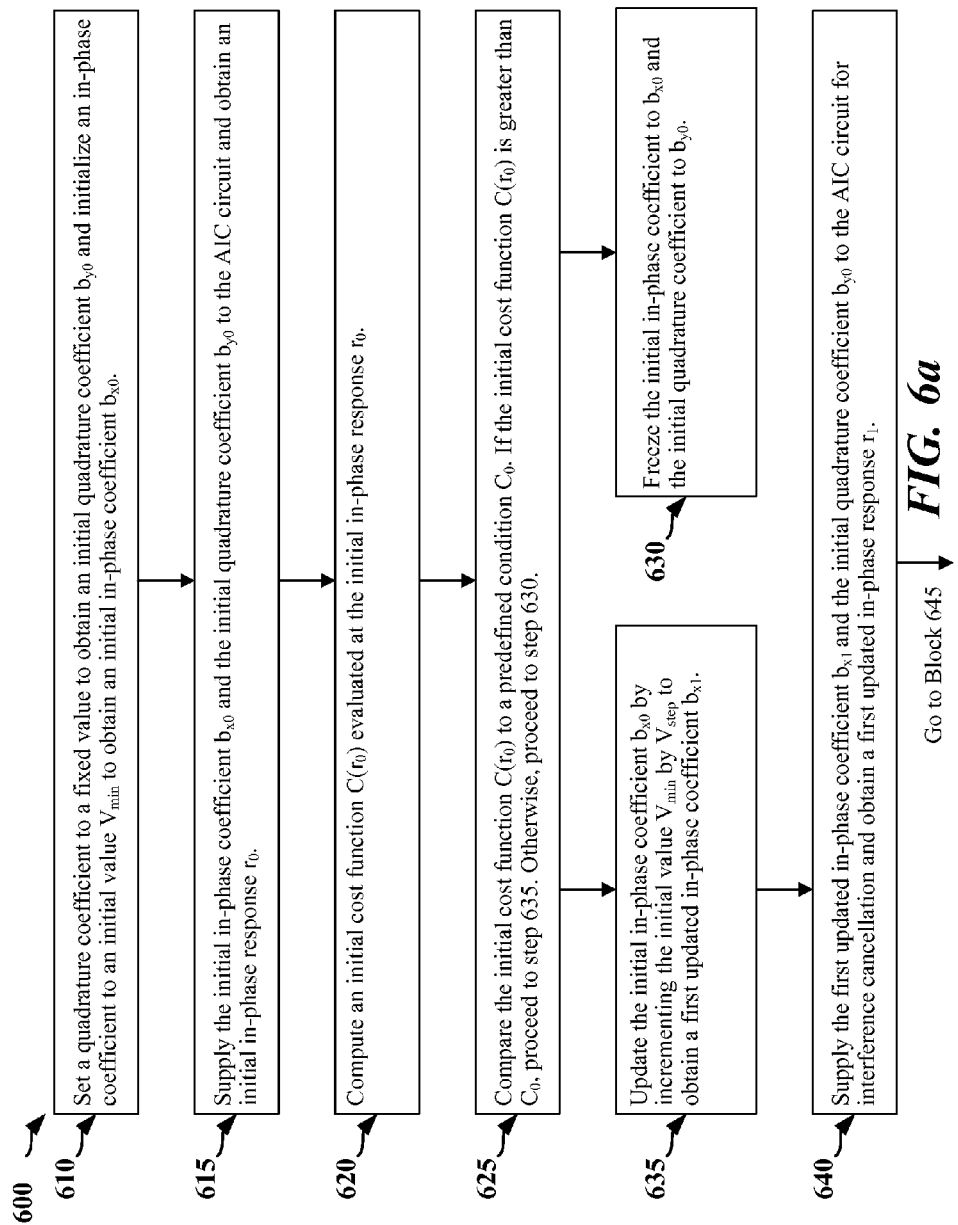

US 9,559,734 B2

ROBUST COEFFICIENT COMPUTATION FOR ANALOG INTERFERENCE CANCELLATION

TECHNICAL FIELD

This disclosure relates generally to the field of interference cancellation systems and methods, and, in particular, to removal or minimization of residual DC offsets (i.e., DC bias) as part of interference cancellation utilizing baseband coefficients.

BACKGROUND

Advanced wireless devices may have multiple radios that operate on the same, adjacent, or harmonic frequencies. The radios may provide access to networks such as wireless wide area network (WWAN), a wireless local area network (WLAN), a wireless personal area network (WPAN), Global Positioning System (GPS), Global Navigation Satellite System (GLONASS), BeiDou navigation satellite system, etc. Some combinations of radios can cause co-existence issues due to interference between the respective frequencies. In particular, when one radio is actively transmitting at or close to the same frequency and at a same time that another radio is receiving, the transmitting radio can cause interference to (i.e., de-sense) the receiving radio. For example, same-band interference may occur between Bluetooth (WPAN) and 2.4 GHz WiFi (WLAN); adjacent band interference between WLAN and Long Term Evolution (LTE) band 7, 40, 41; harmonic interference may occur between 5.7 GHz ISM and 1.9 GHz Personal Communications Service (PCS); and an intermodulation issue may occur between 7xx MHz and a GPS receiver.

Analog interference cancellation (AIC) cancels interference between a transmitter radio and a receiver radio by matching gain and phase of a wireless coupling path signal and in a wired AIC path, as shown in FIG. 1, where $d_t$ is a transmitted signal from a transmitter (aggressor) radio 102, and $h_c$ is a coupling channel (wireless coupling path signal) from the transmitter radio 102 to a receiver (victim) radio 104. AIC 106 attempts to cancel the impact of the coupling channel $h_c$ as reflected via the negative sign on the output of AIC 106. The cancellation may be applicable not only for the separate transmitter-receiver antenna scenarios, but also for the scenarios where the transmitter(s) and receiver(s) share the same antenna(s). In the latter case, over-the-air coupling channel may be further simplified to wired channel.

Analog interference cancellation may be performed utilizing adaptive filter coefficients computed either at RF or at baseband, where baseband means utilizing a digital implementation, for example, a field programmable gate array (FPGA), digital signal processing (DSP) elements or application-specific integrated circuits (ASIC). Baseband coefficient computation may allow more precise coefficient determination which may lead to optimal interference cancellation. The coefficients thus computed are sent to the analog interference cancellation (AIC) circuit for conditioning the reference signal to cancel the undesired interference. However, one disadvantage of baseband processing is undesired DC offset leakage. That is, the reference signal, after AIC conditioning, may have a residual dc bias which may degrade the interference cancellation.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to various aspects of the disclosure a method for interference cancellation, including utilizing a receiver to receive a transmission signal; computing a first cost function value utilizing a first set of coefficients; computing a second set of coefficients utilizing a first coefficient control algorithm; computing a second cost function value utilizing the second set of coefficients; comparing the second cost function value with the first cost function value to yield a comparison; utilizing the comparison to determine whether to apply the first set or the second set of coefficients for the interference cancellation; and applying one of the first set or the second set of coefficients to filter a reference signal and subtracting the filtered reference signal from the received transmission signal for the interference cancellation.

In various aspects, an apparatus for interference cancellation, including at least one processor; a memory for storing a first set of coefficients, the memory coupled to the at least one processor; a receiver coupled to the at least one processor, the receiver configured for receiving a transmission signal; a coefficient controller coupled to the at least one processor configured for performing the following: computing a first cost function value utilizing the first set of coefficients; computing a second set of coefficients utilizing a first coefficient control algorithm; computing a second cost function value utilizing the second set of coefficients; comparing the second cost function value with the first cost function value to yield a comparison; and utilizing the comparison to determine whether to apply the first set or the second set of coefficients for the interference cancellation; and an analog interference cancellation (AIC) circuit for applying one of the first set or the second set of coefficients to filter a reference signal, and wherein the receiver subtracts the filtered reference signal from the received transmission signal for the interference cancellation.

In various aspects, an apparatus for interference cancellation, including at least one processor; a memory for storing a first set of coefficients, the memory coupled to the at least one processor; a receiver coupled to the at least one processor for receiving a transmission signal; means for computing a first cost function value utilizing the first set of coefficients; means for computing a second set of coefficients utilizing a first coefficient control algorithm; means for computing a second cost function value utilizing the second set of coefficients; means for comparing the second cost function value with the first cost function value to yield a comparison; means for utilizing the comparison to determine whether to apply the first set or the second set of coefficients for the interference cancellation; and means for applying one of the first set or the second set of coefficients to filter a reference signal and wherein the receiver subtracts the filtered reference signal from the received transmission signal for the interference cancellation.

In various aspects, a computer-readable storage medium storing computer executable code, operable on a device comprising at least one processor; a memory for storing a first set of coefficients, the memory coupled to the at least one processor; a receiver coupled to the at least one processor, wherein the receiver is configured to receive a transmission signal; and the computer executable code including instructions for causing the at least one processor to compute a first cost function value utilizing the first set of coefficients; instructions for causing the at least one processor to compute a second set of coefficients utilizing a first coefficient control algorithm; instructions for causing the at least one processor to compute a second cost function value utilizing the second set of coefficients; instructions for causing the at least one processor to compare the second cost function value with the first cost function value to yield a comparison; instructions for causing the at least one processor to utilize the comparison to determine whether to apply the first set or the second set of coefficients for interference cancellation; and instructions for causing the at least one processor to apply one of the first set or the second set of coefficients to filter a reference signal, wherein the receiver is further configured to subtract the filtered reference signal from the received transmission signal for the interference cancellation.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the present disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 6a-6c illustrate a flow diagram of an example algorithm for utilizing voltage sweeping to determine coefficients for minimizing residual dc bias while implementing interference cancellation in a receiver.

DETAILED DESCRIPTION

Figure 1:
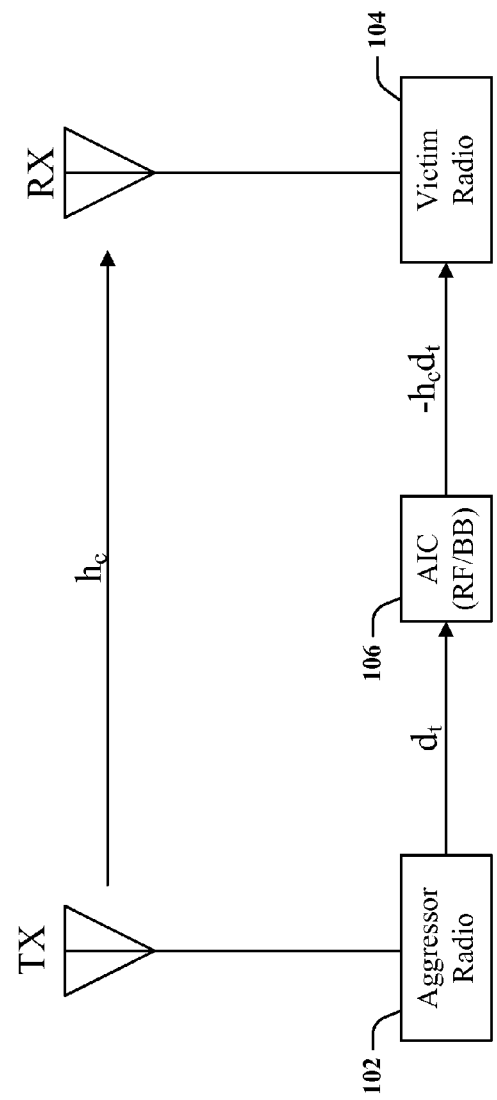
FIG. 1 is a block diagram illustrating an analog interference cancellation system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for cancelling local interference resulting from transmissions by one radio (transceiver) that affect the receiving performance of a second radio (transceiver). In particular aspects, an interference cancellation system is adaptable for different radio combinations. For instance, for a co-existence issue caused by a first combination of radios, a transmitting radio (e.g., WiFi) may be selected for an input of an interference cancellation (IC) circuit and a receiving radio (e.g., Bluetooth) may be selected for the output of the interference cancellation circuit. For a co-existence issue caused by a second (different) combination of radios, the transmitting radio (e.g., WiFi) may be selected for the input of the interference cancellation circuit and the receiving radio (e.g., LTE band 7) may be selected for the output of the interference cancellation circuit. It should be noted that the terms cancellation (as in interference cancellation) and variants thereof may be synonymous with reduction, mitigation, and/or the like in that at least some interference is reduced.

Within the scope of the present disclosure, any suitable interference cancellation circuit may be utilized. In some aspects of the disclosure, an interference cancellation circuit may be an analog one-tap adaptive filter configured to match the signal in the interference cancellation path with the signal in the coupling path. In various examples, the analog one-tap adaptive filter is an analog one-tap least mean square (LMS) adaptive filter. The LMS adaptive filter may operate such that it mimics a desired filter utilizing filter coefficients calculated to produce the least mean square of an error signal, which may represent the difference between a desired signal and an observed or received signal. A conventional one-tap interference cancellation filter ideally focuses its peak cancellation energy at the frequency where the power of an interfering signal is at its highest and accordingly can typically address one type of interference and/or interference affecting one frequency or band of frequencies. A DC offset may be applied to the filter to actively steer the cancellation center, with the value of the DC offset being automatically calculated in the digital domain in accordance with a baseband signal derived from the receiver. The DC offset may be generated utilizing filter coefficients calculated in the digital domain in accordance with the baseband signal.

In accordance with certain aspects of the present disclosure, filter coefficient (i.e., unknown dc bias) are determined and provided to an AIC circuit for interference cancellation by minimizing the cost function, that is, minimizing the cancellation error.

Figure 2:
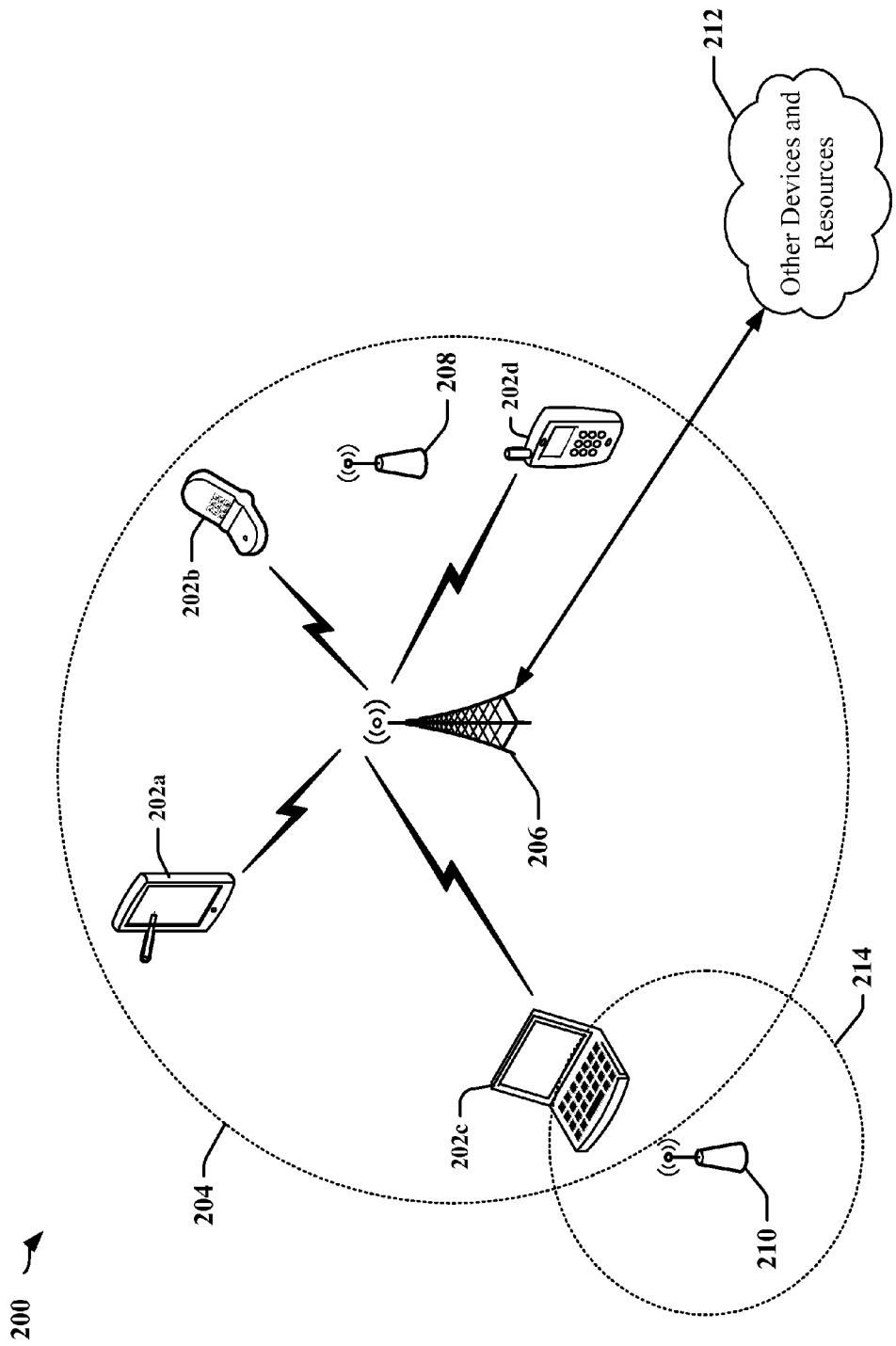
FIG. 2 is a diagram illustrating a networking environment that includes one or more wireless communication devices.

FIG. 2 is a diagram illustrating a networking environment 200 that includes one or more wireless communication devices 202a-202d. Each wireless communication device 202a-202d may be adapted or configured to transmit and/or receive wireless signals to/from at least one access point 206, 208, 210. In some instances, the wireless communication device 202a-202d may be adapted or configured to transmit and/or receive wireless signals to/from at least one other wireless communication device 202a-202d. The one or more wireless communication devices 202a-202d may include a mobile device and/or a device that, while movable, is primarily intended to remain stationary. In various examples, the device may be a cellular phone, a smart phone, a personal digital assistant, a portable computing device, a wearable computing device, and appliance, a media player, a navigation device, a tablet, etc. The one or more wireless communication devices 202a-202d may also include a stationary device (e.g., a desktop computer, machine-type communication device, etc.) enabled to transmit and/or receive wireless signals. The one or more wireless communication devices 202a-202d may include an apparatus or system embodied in or constructed from one or more integrated circuits, circuit boards, and/or the like that may be operatively enabled for use in another device. Thus, as used herein, the terms "device" and "mobile device" may be used interchangeably as each term is intended to refer to any single device or any combinable group of devices that may transmit and/or receive wireless signals.

One or more of the access points 206, 208, 210 may be associated with a radio access network (RAN) 204, 214 that provides connectivity utilizing a radio access technology (RAT). The RAN 204, 214 may connect the one or more wireless communication devices 202a-202d to a core network. In various examples, the RAN 204, 214 may include a WWAN, a WLAN, a WPAN, a wireless metropolitan area network (WMAN), a Bluetooth communication system, a WiFi communication system, a Global System for Mobile communication (GSM) system, an Evolution Data Only/Evolution Data Optimized (EVDO) communication system, an Ultra Mobile Broadband (UMB) communication system, an LTE communication system, a Mobile Satellite Service-Ancillary Terrestrial Component (MSS-ATC) communication system, and/or the like.

The RAN 204, 214 may be enabled to communicate with and/or otherwise operatively access other devices and/or resources as represented simply by cloud 212. For example, the cloud 212 may include one or more communication devices, systems, networks, or services, and/or one or more computing devices, systems, networks, or services, and/or the like or any combination thereof.

In various examples, the RAN 204, 214 may utilize any suitable multiple access and multiplexing scheme, including but not limited to, Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), etc. In examples where the RAN 204, 214 is a WWAN, the network may implement one or more standardized RATs such as Digital Advanced Mobile Phone System (D-AMPS), IS-95, cdma2000, Global System for Mobile Communications (GSM), UMTS, eUTRA (LTE), or any other suitable RAT. GSM, UMTS, and eUTRA are described in documents from a consortium named "3rd Generation Partnership Project" (3GPP). IS-95 and cdma2000 are described in documents from a consortium named "3rd Generation Partnership Project 2" (3GPP2). 3GPP and 3GPP2 documents are publicly available. In examples where the RAN 204, 214 is a WLAN, the network may be an IEEE 802.11x network, or any other suitable network type. In examples where the RAN 204, 214 is a WPAN, the network may be a Bluetooth network, an IEEE 802.15x, or any other suitable network type.

A wireless communication device 202a-202d may include at least one radio (also referred to as a transceiver). The terms "radio" or "transceiver" as used herein refer to any circuitry and/or the like that may be enabled to receive wireless signals and/or transmit wireless signals. In particular aspects, two or more radios may be enabled to share a portion of circuitry and/or the like (e.g., a processing unit, memory, etc.). That is, the terms "radio" or "transceiver" may be interpreted to include devices that have the capability to both transmit and receive signals, including devices having separate transmitters and receivers, devices having combined circuitry for transmitting and receiving signals, and/or the like.

In some aspects, a wireless communication device 202a-202d may include a first radio enabled to receive and/or transmit wireless signals associated with at least a first network of a RAN 204, 214 and a second radio that is enabled to receive and/or transmit wireless signals associated with an access point 206, 208, 210, a peer device or other transmitter that may geographically overlap or be collocated with the RAN 204, 214, and/or a navigation system (e.g., a satellite positioning system and/or the like).

Figure 3:
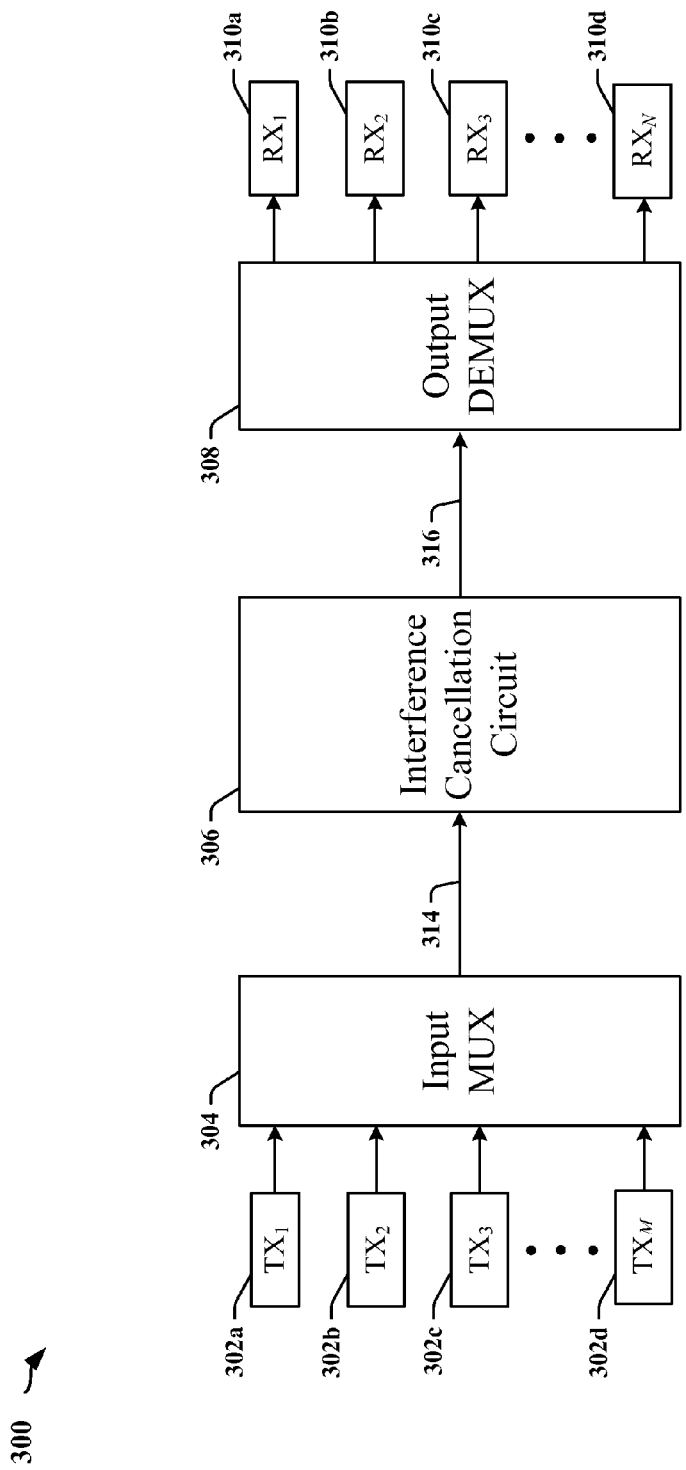
FIG. 3 is a block diagram illustrating a wireless communication device having plural transmitters and plural receivers, according to various embodiments of the disclosure.

FIG. 3 is a block diagram illustrating a wireless communication device 300 that includes a plurality of transmitters 302a-302d and a plurality of receivers 310a-310d, in accordance with certain aspects disclosed herein. The M transmitters 302a-302d and N receivers 310a-310d may be provided as up to M×N receiver/transmitter (Rx/Tx) circuits. One skilled in the art would understand that the quantity M and the quantity N may or may not be the same. And, in some cases, either of the quantities may be zero. Coexistence issues may occur when one or more transmitters 302a-302d are actively transmitting, and one or more receivers 310a-310d are actively receiving.

Each of the Rx/Tx circuits 310a/302a, 310b/302b, 310c/302c, and/or 310d/302d may be configured to operate according to certain parameters including, for example, a respective frequency, radio frequency circuits with group delays, coupling channel gains to other Tx/Rx circuits Rx/Tx circuits 310a/302a, 310b/302b, 310c/302c, 310d/302d, and/or the like. For instance, the first Tx/Rx circuit 310a/302a may operate at a first frequency $f_1$ with a first delay $d_1$, the second Tx/Rx circuit 310b/302b may operate at a second frequency $f_2$ with a second delay $d_2$, the third Tx/Rx circuit 310c/302c may operate at a third frequency $f_3$ with a third delay $d_3$, etc. The first Tx/Rx circuit 310a/302a may have a coupling channel gain $h_{12}$ to the second Tx/Rx circuit 310b/302b, a coupling channel gain $h_{13}$ to the third Tx/Rx circuit 310c/302c, etc. A Tx/Rx circuit 310/302 may have different coupling channel gains to various other Tx/Rx circuits.

In various aspects, the apparatus 300 is configured to reduce interference produced among Tx/Rx circuits 310a/302a, 310b/302b, 310c/302c, 310d/302d operating, for example, on the same, adjacent, harmonic, or sub-harmonic frequencies. An apparatus 300 may be configured or adapted for different Tx/Rx circuit combinations. That is, the apparatus 300 may be configured to cancel interference based on a co-existence issue caused by current combination of Tx/Rx circuits 310a/302a, 310b/302b, 310c/302c, and/or 310d/302d. For example, a co-existence issue at a time $T_1$ may be caused when the first transmitter 302a is employed for WiFi and the second receiver 310b is employed for Bluetooth. In some systems, the apparatus may be configured to selectively provide the output of the first transmitter 302a to an interference cancelling (IC) circuit 306, which may then provide an interference cancelation signal 316 to the second receiver 310b. Accordingly, the interference cancellation circuit 306, interference caused by the aggressor Tx/Rx circuit 310a/302a upon the victim Tx/Rx circuit 310b/302b can be reduced. In various examples, the coupling channel gain from the aggressor 310a/302a to the victim Tx/Rx circuit 310b/302b may be −10 dB based on separation of two antennas, and the interference cancellation circuit 306 may be configured to match this gain for successful interference cancellation. In operation aspects, the apparatus 300 may include a multiplexer (MUX) circuit 304 and a demultiplexer (DEMUX) circuit 308 that may be controlled to select an interference cancellation configuration.

Figure 4:
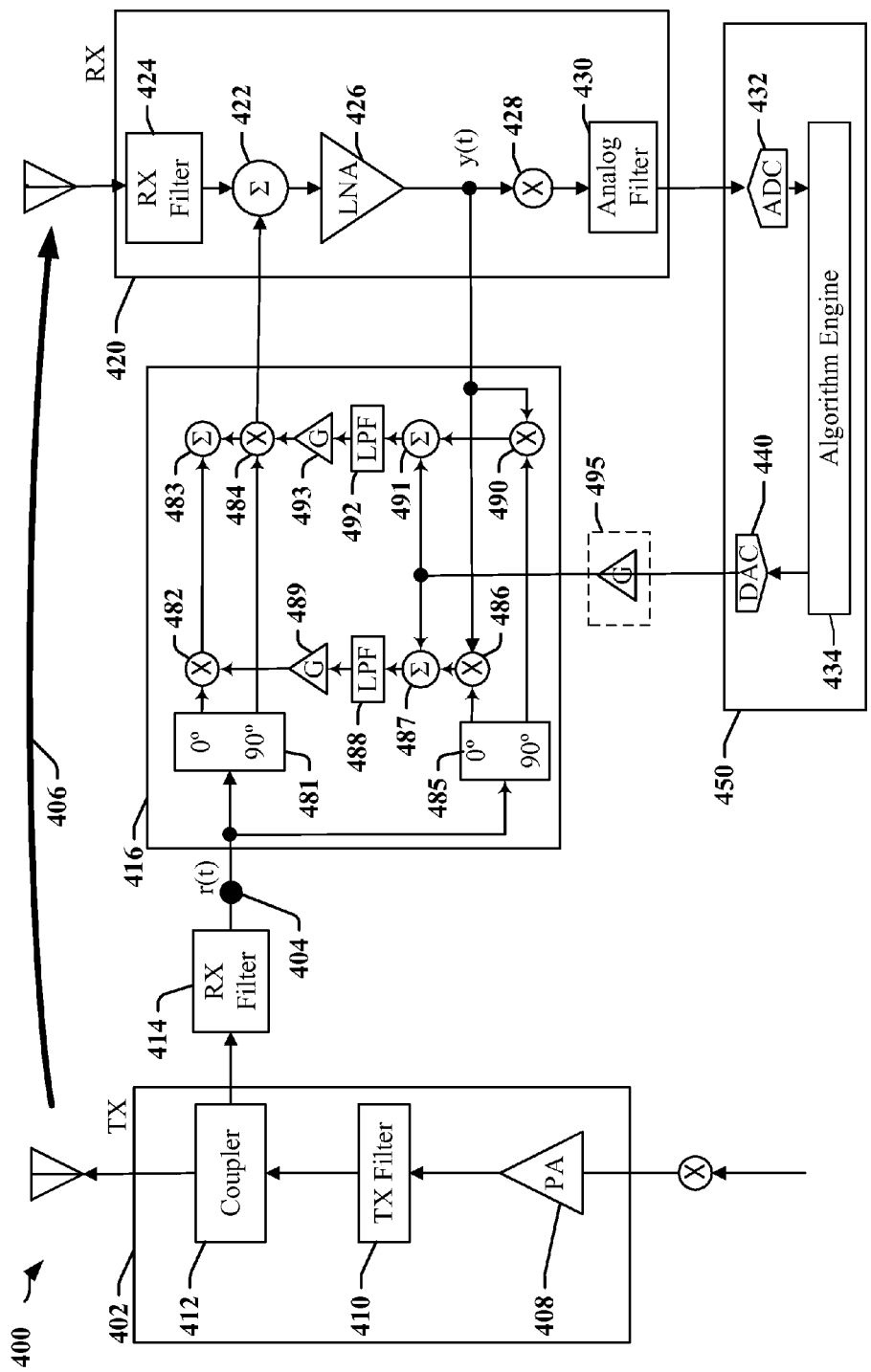
FIG. 4 is a block diagram illustrating a system that may be adapted for performing interference cancellation according to various aspects disclosed herein.

FIG. 4 illustrates certain aspects of a system 400 for cancelling local interference between a transmitter 402 and a receiver 420 in accordance with certain aspects disclosed herein. The system 400 may be associated with one or more subsystems, apparatus, devices, or components. The transmitter (TX) 402 may be an offending transmitter and the receiver 420 may be a victim receiver. That is, the transmitter 402 may be an offender that generates or causes local interference in connection with an over-the-air interfering signal 406 received by the victim receiver 420. The offending transmitter 402 and victim receiver 420 may be part of the same device. Moreover, while a single transmitter 402 and a single receiver 420 are shown, more than one transmitter 402 and/or more than one receiver 420 may be provided in accordance with aspects of the disclosure. In various aspects, the transmitter 402 is one of the transmitters 302 shown in FIG. 3 and the receiver 420 is one of the receivers 310 shown in FIG. 3.

The transmitter 402 may be associated with, or coupled to, a power amplifier (PA) 408 and a TX filter 410, which components are well-known in the art and so a further description is omitted for the sake of brevity. The PA 408 may receive a signal or data for transmission by the TX 402.

The transmitter 402 may be associated with a coupler 412. The coupler 412 may be used to provide a reference signal r(t) 404 to an AIC circuit 416. The reference signal may correspond to some portion or function of the signal transmitted by the transmitter 402, and may be provided through a receive filter 414. In various examples, the AIC circuit 416 may include a one-tap adaptive filter (e.g., a one-tap least mean square (LMS) adaptive filter).

Broadly, the AIC circuit 416 may be configured to generate an output signal that matches the over-the-air interfering signal 406 within a given tolerance, such that the AIC output can be combined with the over-the-air interfering signal 406 in a destructive fashion to cancel the local interference signal. The AIC circuit 416 may receive DC offsets from a coefficient controller to minimize residual dc bias. The AIC circuit 416 may be configured to generate an output that can be supplied as a first input to an adder 422. Although component 422 is depicted as an adder in FIG. 4, one skilled in the art would understand that the component 422 may be a combiner, an integrator or another component that combines or adds signals. A second input to the adder 422 may correspond to the over-the-air interfering signal 406 received by the RX 420. In some instances, the over-the-air interfering signal 406 may be provided to the adder 422 through a receive filter 424.

The adder 422 may be configured to combine its inputs in order to generate an output that is provided to a low-noise amplifier (LNA) 426. In various examples, the adder 422 may be configured to subtract the input provided by the AIC circuit 416 from the input received from the receive filter 424. In an ideal case where selection of filter coefficients is perfect, the signal provided at the first input of the adder 422 is equal to the interference associated with the over-the-air interfering signal 406, such that the interference is removed in the signal provided to the LNA 426. In this respect, the path from the coupler 412, through the receive filter 414, to the AIC circuit 416 may serve as a reference path in order to provide a reference signal r(t).

The system 400 may provide for the receive filter 414 in the reference signal path and the receive filter 424 coupled to the receiver antenna to have the same filter characteristics within a specified tolerance. That is, filtering both signals in the same way can help ensure that any timing mismatch between the reference signal r(t) and the received signal (i.e., the over-the-air interfering signal 406) is reduced or eliminated.

In some instances, the AIC circuit 416 may be configured utilizing information that is based on the received signal after it is converted into a baseband signal. In various examples, a coefficient controller 450 may derive one or more coefficients from a baseband signal and configure the AIC circuit 416 based on the coefficients. That is, the output y(t) from the LNA 426 may be provided to a mixer 428 and to the AIC circuit 416. The mixer 428 then converts the output y(t) from the LNA 426 from a first signal domain or frequency to a second signal domain or frequency. For example, the first signal domain may relate to a selected radio frequency and the second signal domain may relate to baseband frequencies. Here, a baseband signal may include an unmodulated signal, a lowpass signal, or a signal at relatively low frequencies, in some examples corresponding to an audible range up to 20 kHz, for example. In some instances, the mixer 428 may receive a signal from an oscillator such as a voltage-controlled oscillator (VCO) in order to provide the conversion to baseband.

The output baseband signal from the mixer 428 may be provided to an analog filter 430 that may operate as an anti-aliasing filter. The output of the analog filter 430 may be provided to an analog-to-digital converter (ADC) 432 shown to reside within the coefficient controller 450. The output of the ADC 432 is provided to an algorithm engine 434 to provide a measure of the response of the receiver 420. In various examples, the response of the receiver is the superposition of desired signal, interference and noise present at the output of the receiver. The algorithm engine 434 may accommodate one or more algorithms. For example, an algorithm may be used to calculate cost function(s) while another algorithm may be used for coefficient control.

Figure 5:
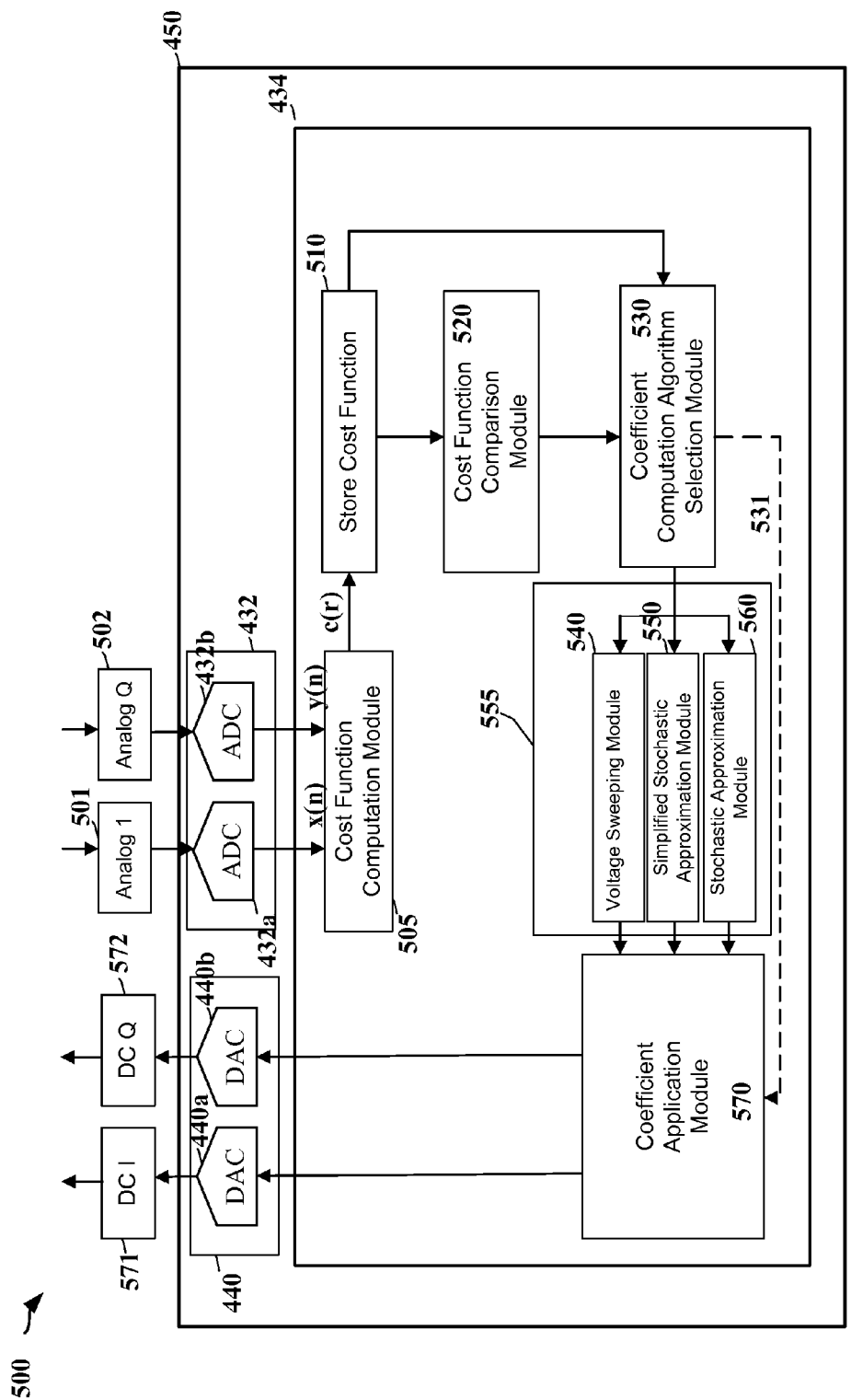
FIG. 5 is a block diagram illustrating an implementation of a coefficient controller for a receiver in a wireless communication system.

The algorithm engine 434 may be configured to generate and output one or more signals representative of DC offset, and/or filter coefficients to the AIC circuit 416. The algorithm engine 434 may produce an output in a digital format, and the output may be provided to a digital-to-analog converter (DAC) 440. The output of the DAC 440 may then be provided to the AIC circuit 416. As shown in FIG. 5, the algorithm engine 434, in various examples, may include one or more of the following components: cost function computation module 505, store cost function module 510, cost function comparison module 520, coefficient computation algorithm selection module 530, coefficient computation module 555 and/or coefficient application module 570. One skilled in the art would understand that the list of components within the algorithm engine 434 is not an exclusive list and that other components may be included and be within the scope and spirit of the present disclosure.

The AIC circuit 416 may include polyphase components 481 and 485. The polyphase components 481 and 485 may be used to generate in-phase and quadrature signal outputs relative to the reference signal 404. The in-phase signal output may be generated by simply passing the reference signal 404 with no phase shift (e.g., a 0 degree phase shift). The quadrature signal output may be generated by applying a 90 degree phase shift to the reference signal 404.

The in-phase signal output by a first polyphase component 481 is provided to a mixer 482. The quadrature signal output by the first polyphase component 481 is provided to a mixer 484. The outputs of the mixers 482, 484 are provided to an adder, integrator, or combiner 483. The output of the adder 483 serves as an input to the adder 422.

The in-phase signal output by a second polyphase component 485 is provided to a mixer 486. The quadrature signal output by the second polyphase component 485 is provided to a mixer 490. The mixers 486, 490 each receive a second input corresponding to the output of the LNA 426. That is, in some aspects of the disclosure, feedback corresponding to the output signal of the receiver 420 is provided as an input to the AIC circuit 416.

The output of the mixer 486 is provided to a first adder or integrator 487. The output of the mixer 490 is provided to a second adder or integrator 491. A second input to each of the integrators 487, 491 is provided by a coefficient controller 450 that generates coefficients from the digitized received signal that may be used to steer the AIC circuit 416. The outputs of the integrators 487, 491 may be provided to one or more filters, including first and second low pass filters (LPFs) 488 and 492, respectively. The outputs of the first and second LPFs 488, 492 may be provided to one or more amplifiers 489 and 493, respectively. The amplifiers 489, 493 may each have independently controlled gain (G) values. In some instances, a common gain may be used in connection with both of the amplifiers 489 and 493. The outputs of the amplifiers 489, 493 may be provided as inputs to the mixers 482 and 484, respectively.

A second input to each of the integrators 487, 491 corresponds to coefficients and/or offsets output by an algorithm engine 434 executed by the coefficient controller 450. The coefficients are not directly based on the RF signal output by the LNA 426, but rather, the coefficients are based on the received signal after it is converted into a baseband signal utilizing an analog-to-digital converter (ADC) 432. That is, a coefficient controller 450 may generate one or more coefficients from the baseband signal to steer the AIC circuit 416. Digital coefficients may be converted to an analog signal utilizing a digital-to-analog converter 440.

Interference cancellation circuits provided according to certain aspects disclosed herein can be adapted to simultaneously handle multiple interference sources and/or types that may affect a receiver. In various examples, a source of interference may be a nearby and/or local transmit antenna that transmits LTE signals in frequencies allocated to LTE. These LTE signals can produce strong interference at a Wi-Fi receive antenna. Different types of interference may be produced, including interference caused by out-of-band (OOB) emission, fundamental emission, and phase noise. Interference may be produced even if the frequencies used by the Wi-Fi channel are far from the frequencies used by LTE. In one specific example, interference may occur between the 2.462 GHz Wi-Fi Channel 11 and LTE transmissions in LTE band 40 (B40), which is allocated frequencies between 2.3 GHz and 2.4 GHz with a bandwidth of 100 MHz. Interference may occur because the channelization filter, which may be an analog anti-aliasing filter, is placed after a mixer, and an excessive amount of energy falls into the Wi-Fi band, and saturates RX front end.

FIG. 5 is a block diagram illustrating an implementation of a coefficient controller for a receiver in a wireless communication system. In various examples, the received baseband signal s(t) is decomposed into orthogonal signal components, in-phase received baseband signal i(t) and quadrature received baseband signal q(t). Each orthogonal signal component, that is i(t) and q(t), is processed by analog input signal processing modules 501 and 502, respectively. In various examples, the analog input signal processing modules 501 and 502 may include baseband signal processing functions such as low pass filtering, amplification, anti-aliasing filtering, dc bias compensation, etc. Next, the processed orthogonal signal components are then converted into digital orthogonal signal components, x(n) and y(n), utilizing analog-to-digital converters. In various examples, the processed orthogonal signal components are converted by separate analog-to-digital converters 432a and 432b to produce the digital orthogonal signal components, x(n) and y(n). In various examples, the separate analog-to-digital converters operate with a sample rate R at least as high as twice the signal bandwidth B (e.g., Nyquist-Shannon sampling criterion). In another example, the separate analog-to-digital converters operate with an amplitude resolution corresponding to N bits. These digital orthogonal signal components serve as inputs to the algorithm engine 434 within the coefficient controller 450. In various examples, the algorithm engine 434 may be implemented as a field programmable gate array (FPGA), an application specific integrated circuit (ASIC), a digital signal processor (DSP), a software-based processor, or any suitable type of computation platform.

Next, the digital orthogonal signal components x(n) and y(n) are inputted into a cost function computation module 505. The cost function computation module 505 computes cost function values utilizing coefficients for the AIC circuit 416 for interference cancellation. In various examples, initial coefficient values may be stored values, random values or may be set to zero values. Subsequent computation uses currently derived values which are being updated. In various examples, the cost function computation module 505 produces a cost function C(r) which is used to optimize coefficients (e.g., baseband coefficients) used in the AIC circuit 416. In another example, the cost function computation module 505 produces a cost function C(r) for a plurality of samples of the digital orthogonal signal components x(n) and y(n), where r=x+jy and j is the imaginary unit (i.e., the square root of −1). For example, the cost function C(r) may be computed as a sample average; i.e., an unweighted summation of the square of the magnitudes of the digital orthogonal signal components over a predefined quantity of samples M (i.e., a predetermined duration of time):

$$C(r)=S_1=\Sigma_{n=1}^{M}\|x(n)\|^2\|y(n)\|^2 \qquad \text{eqn (1)}$$

Alternatively, the cost function C(r) may be computed as a moving average of the square of the magnitudes of the digital orthogonal signal components with a weighting factor α:

$$C(r)=S_{MA}(k)=\alpha S(k)+(1-\alpha)S_{MA}(k-1) \qquad \text{eqn (2)}$$

where $$S(k) = \|x(n)\|^2 + \|y(n)\|^2 \quad \text{eqn (3)}$$

$$0 < \alpha \leq 1 \quad \text{eqn (4)}$$

In various examples, the weighting factor α may be selected such that (1−α) is a power of 2 (e.g. $2^0$, $2^{-1}$, $2^{-2}$, ...) for numerical convenience, or may be selected as fully configurable. In various aspects, the moving average has the advantage of a variable duration of time through the configuration of α. In other aspects, the moving average may allow a simpler hardware implementation (e.g., avoidance of division).

A cost function comparison module 520 compares cost function values. Next, the cost function C(r) is stored in a cost function storage module 510. The cost function C(r) is then subsequently retrieved from the cost function storage module 510 and compared to a cost function threshold $C_0$ to determine to update or to hold the coefficients (to be used in the AIC circuit 416) at their values.

In various examples, if the cost function C(r) exceeds the cost function threshold $C_0$, then the coefficients are updated. Otherwise, the coefficients are held at their values (i.e., frozen). In various aspects, the cost function corresponds to a received signal strength indication (RSSI) and the cost function comparison determines whether or not the RSSI is stronger than a RSSI threshold (e.g., interference is strong enough to warrant an updated baseband coefficient for the AIC circuit 416). In various examples, the cost function may be based on other system parameters such as interference-to-signal level(s).

A coefficient computation algorithm selection module 530 may determine whether to apply a set of coefficients for interference cancellation or to update the set of coefficients. If the set of coefficients is to be applied for interference cancellation, the set of coefficients is sent from the coefficient computation algorithm selection module 530 (via line 531) to a coefficient application module 570. If the set of coefficients is to be updated, a coefficient computation algorithm is selected by the coefficient computation algorithm selection module 530. In various examples, the coefficient computation algorithm may be selected among a voltage sweeping algorithm within the voltage sweeping module 540, a simplified stochastic approximation algorithm within the simplified stochastic approximation module 550, or a stochastic approximation algorithm within the stochastic approximation module 560. One skilled in the art would understand that other coefficient computation algorithms (different from the ones listed herein) may be used in other examples without deviating from the scope and spirit of the present disclosure. Subsequently, updated baseband coefficients are computed by the selected coefficient computation algorithm and sent to the coefficient application module 570. In various examples, the coefficient application module 570 supplies updated coefficients (e.g., orthogonal baseband coefficients $b_x$ and $b_y$) as outputs of the algorithm engine 434.

Next, the updated baseband coefficients are sent to digital-to-analog converters to convert the updated baseband coefficients to analog form. In various examples, the updated orthogonal baseband coefficients $b_x$ and $b_y$ are converted by separate digital-to-analog converters 440a and 440b to produce updated analog coefficients $c_x$ and $c_y$. Next, the updated analog coefficients $c_x$ and $c_y$ are processed by analog output signal processing modules 571 and 572 to produce updated processed analog coefficients $d_x$ and $d_y$. In various examples, the analog output signal processing modules 571 and 572 may include baseband signal processing functions such as low pass filtering, amplification, dc bias compensation, etc.

And, the updated processed analog coefficients $d_x$ and $d_y$ are sent to the AIC circuit 416 for interference cancellation. In various examples, the updated processed analog coefficients $d_x$ and $d_y$ are amplified by amplifier 495 before being sent to the AIC circuit 416.

Figure 6B:
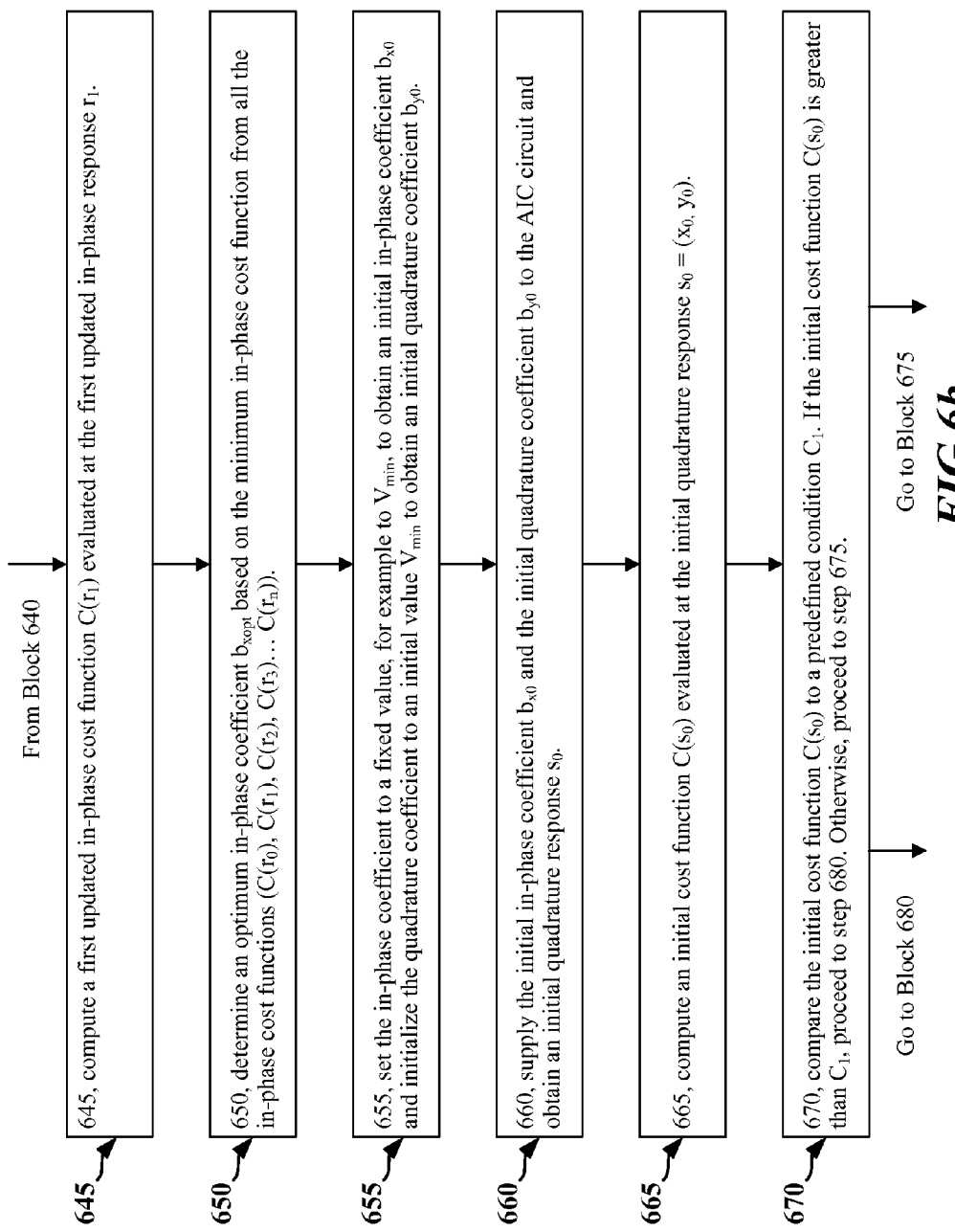
Figure 6C:
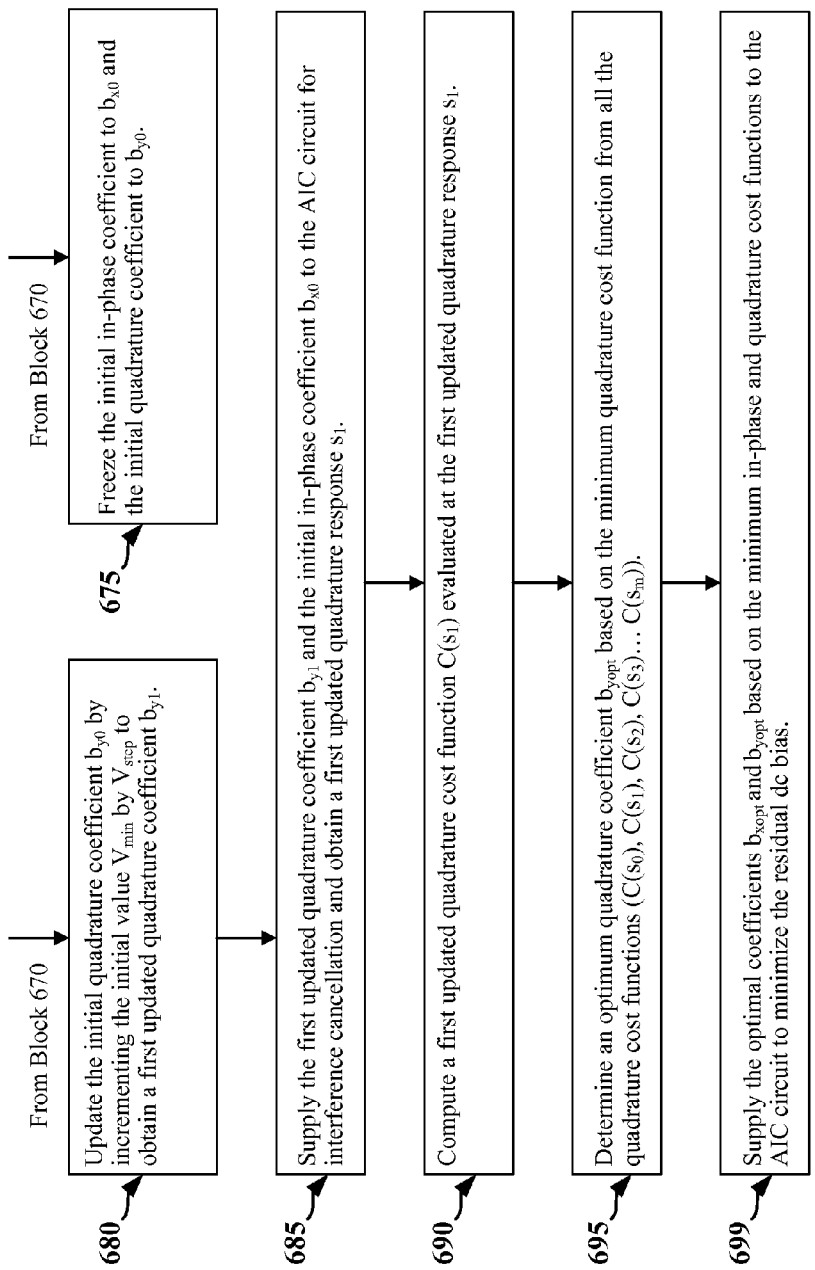

FIGS. 6a-6c illustrate a flow diagram of an example algorithm for utilizing voltage sweeping to determine coefficients for minimizing residual dc bias while implementing interference cancellation in a receiver. In various aspects, the coefficient computation algorithm uses a first digital signal component x(n) and a second digital signal component y(n) as inputs. A coefficient computation algorithm utilizing voltage sweeping produces a first baseband coefficient $b_x$ and a second baseband coefficient $b_y$ as outputs. The first digital signal component x(n) is referred to as an in-phase signal component and the second digital signal component y(n) is referred to as a quadrature signal component. Correspondingly, the first baseband coefficient $b_x$ is referred to as an in-phase coefficient and the second baseband coefficient $b_y$ is referred to as a quadrature coefficient. In various examples, the coefficient computation algorithm utilizing voltage sweeping resides within the algorithm engine 434 (shown in FIG. 4).

In various aspects, the coefficient computation algorithm uses a cost function C to determine optimal performance. Optimal performance may be obtained when the cost function C is minimized.

Fix the Quadrature Component and Increment the In-Phase Component Utilizing Voltage Sweep In block 610, set a quadrature coefficient to a fixed value to obtain an initial quadrature coefficient $b_{y0}$ and initialize an in-phase coefficient to an initial value $V_{min}$ to obtain an initial in-phase coefficient $b_{x0}$. The quadrature coefficient fixed value, for example, may be set to $V_{min}$ also to obtain an initial quadrature coefficient $b_{y0}$. In block 615, supply the initial in-phase coefficient $b_{x0}$ and the initial quadrature coefficient $b_{y0}$ to the AIC circuit 416 and obtain an initial in-phase response $r_0$. In various examples, the initial in-phase response $r_0$ is obtained either as a sample average or as a moving average. The initial in-phase response $r_0$ may be represented by $r_0 = (x_0, y_0)$.

In block 620, compute an initial cost function $C(r_0)$ evaluated at the initial in-phase response $r_0$. In block 625, compare the initial cost function $C(r_0)$ to a predefined condition $C_0$. In various examples, the predefined condition corresponds to a minimum RSSI level. If the initial cost function $C(r_0)$ is greater than $C_0$, proceed to block 635. Otherwise, proceed to block 630 and freeze the initial in-phase coefficient to $b_{x0}$ and the initial quadrature coefficient to $b_{y0}$.

In block 635, update the initial in-phase coefficient $b_{x0}$ by incrementing the initial value $V_{min}$ by $V_{step}$ to obtain a first updated in-phase coefficient $b_{x1}$. Here, $b_{x1} = b_{x0} + V_{step}$, where $V_{step}$ is a voltage increment. In block 640, supply the first updated in-phase coefficient $b_{x1}$ and the initial quadrature coefficient $b_{y0}$ to the AIC circuit 416 for interference cancellation and obtain a first updated in-phase response $r_1$. The first updated in-phase response $r_1$ may be represented by $r_1 = (x_1, y_0)$. In block 645, compute a first updated in-phase cost function $C(r_1)$ evaluated at the first updated in-phase response $r_1$. In various examples, the first updated in-phase response $r_1$ is obtained either as a sample average or as a moving average. Although not shown here, further updating of the in-phase coefficient by incrementing by $V_{step}$ to obtain updated in-phase cost functions ($C(r_2), C(r_3) \ldots C(r_n)$) may be performed. It is understood that the updating of the in-phase coefficient is based on the incrementing of the previous in-phase coefficient by $V_{step}$. In block 650, determine an optimum in-phase coefficient $b_{xopt}$ based on the minimum in-phase cost function from the in-phase cost functions ($C(r_0)$, $C(r_1)$, $C(r_2)$, $C(r_3)$ . . . $C(r_n)$).

Fix the In-Phase Component and Increment the Quadrature Component Utilizing Voltage Sweep In block 655, set the in-phase coefficient to a fixed value, for example to $V_{min}$, to obtain an initial in-phase coefficient $b_{x0}$ and initialize the quadrature coefficient to an initial value $V_{min}$ to obtain an initial quadrature coefficient $b_{y0}$. In block 660, supply the initial in-phase coefficient $b_{x0}$ and the initial quadrature coefficient $b_{y0}$ to the AIC circuit 416 and obtain an initial quadrature response $s_0$. The initial quadrature response $s_0$ may be represented by $s_0=(x_0, y_0)$. In various examples, the initial quadrature response $s_0$ is obtained either as a sample average or as a moving average.

In block 665, compute an initial cost function $C(s_0)$ evaluated at the initial quadrature response $s_0=(x_0, y_0)$. In block 670, compare the initial cost function $C(s_0)$ to a predefined condition $C_1$. $C_1$ may have the same value as $C_0$ in the in-phase coefficient calculation above. In various examples, the predefined condition $C_1$ corresponds to a minimum RSSI level. In various examples, the predefined condition $C_1$ may either be a stored value or a measured value based on the RSSI level. If the initial cost function $C(s_0)$ is greater than $C_1$, proceed to block 680. Otherwise, proceed to block 675 and freeze the initial in-phase coefficient to $b_{x0}$ and the initial quadrature coefficient to $b_{y0}$.

In block 680, update the initial quadrature coefficient $b_{y0}$ by incrementing the initial value $V_{min}$ by $V_{step}$ to obtain a first updated quadrature coefficient $b_{y1}$. Here, $b_{y1}=b_{y0}+V_{step}$. In block 685, supply the first updated quadrature coefficient $b_{y1}$ and the initial in-phase coefficient $b_{x0}$ to the AIC circuit 416 for interference cancellation and obtain a first updated quadrature response $s_1$. The first updated quadrature response $s_1$ may be represented by $s_1=(x_0, y_1)$. In block 690, compute a first updated quadrature cost function $C(s_1)$ evaluated at the first updated quadrature response $s_1$. In various examples, the first updated quadrature response $s_1$ is obtained either as a sample average or as a moving average. Although not shown here, further updating of the quadrature coefficient by incrementing by $V_{step}$ to obtain updated quadrature cost functions ($C(s_2)$, $C(s_3)$ . . . $C(s_m)$) may be performed. It is understood that the updating of the quadrature coefficient is based on the incrementing of the previous quadrature coefficient by $V_{step}$. In block 695, determine an optimum quadrature coefficient $b_{yopt}$ based on the minimum quadrature cost function from the quadrature cost functions ($C(s_0)$, $C(s_1)$, $C(s_2)$, $C(s_3)$ . . . $C(s_m)$).

In block 699, supply the optimal coefficients $b_{xopt}$ and $b_{yopt}$ based on the minimum in-phase and quadrature cost functions to the AIC circuit 416 to minimize the residual dc bias.

Figure 7A:
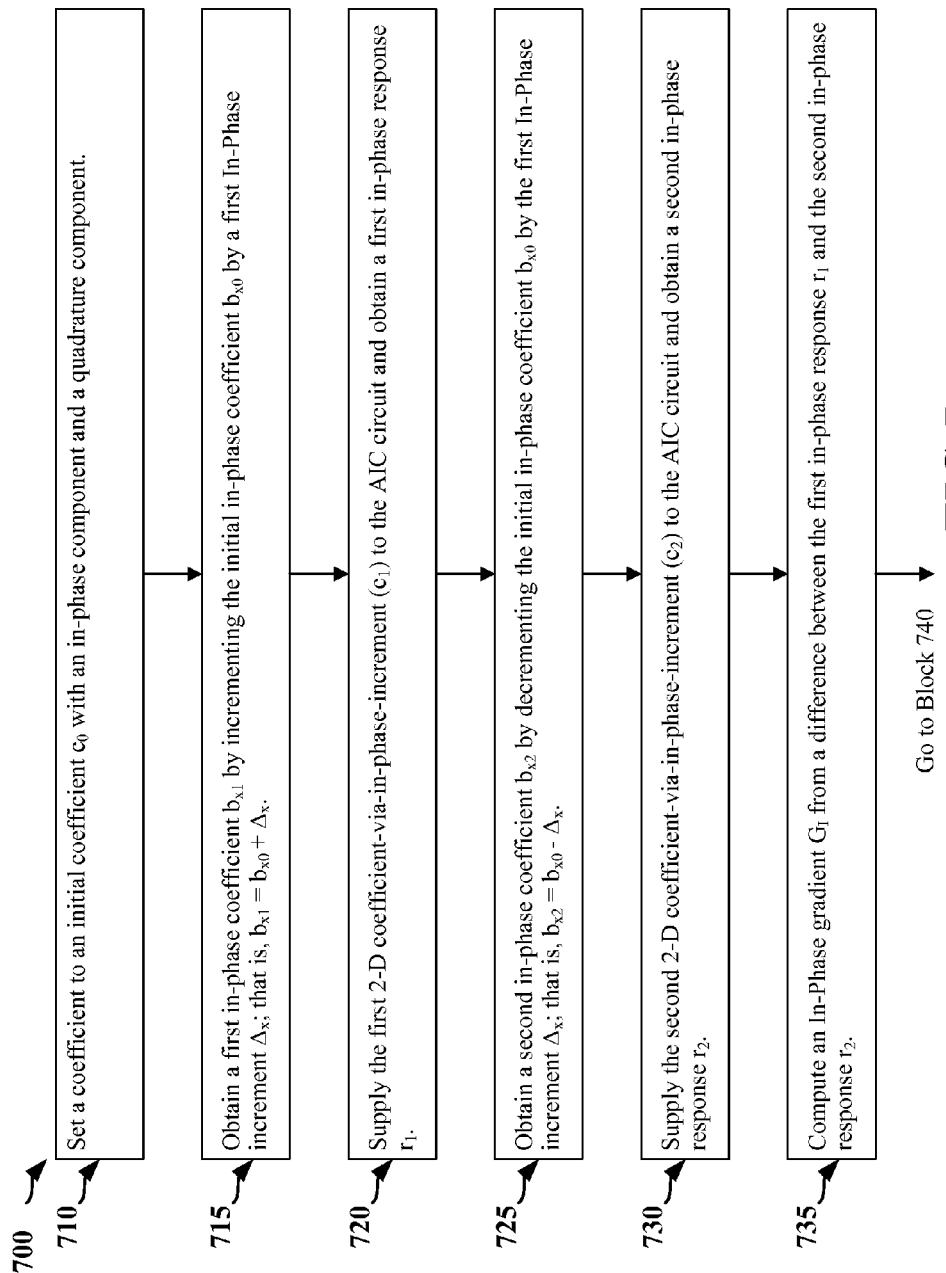
FIGS. 7a-7c illustrate a flow diagram of an example algorithm for utilizing a stochastic approximation to determine coefficients for minimizing residual dc bias while implementing interference cancellation in a receiver.
Figure 7B:
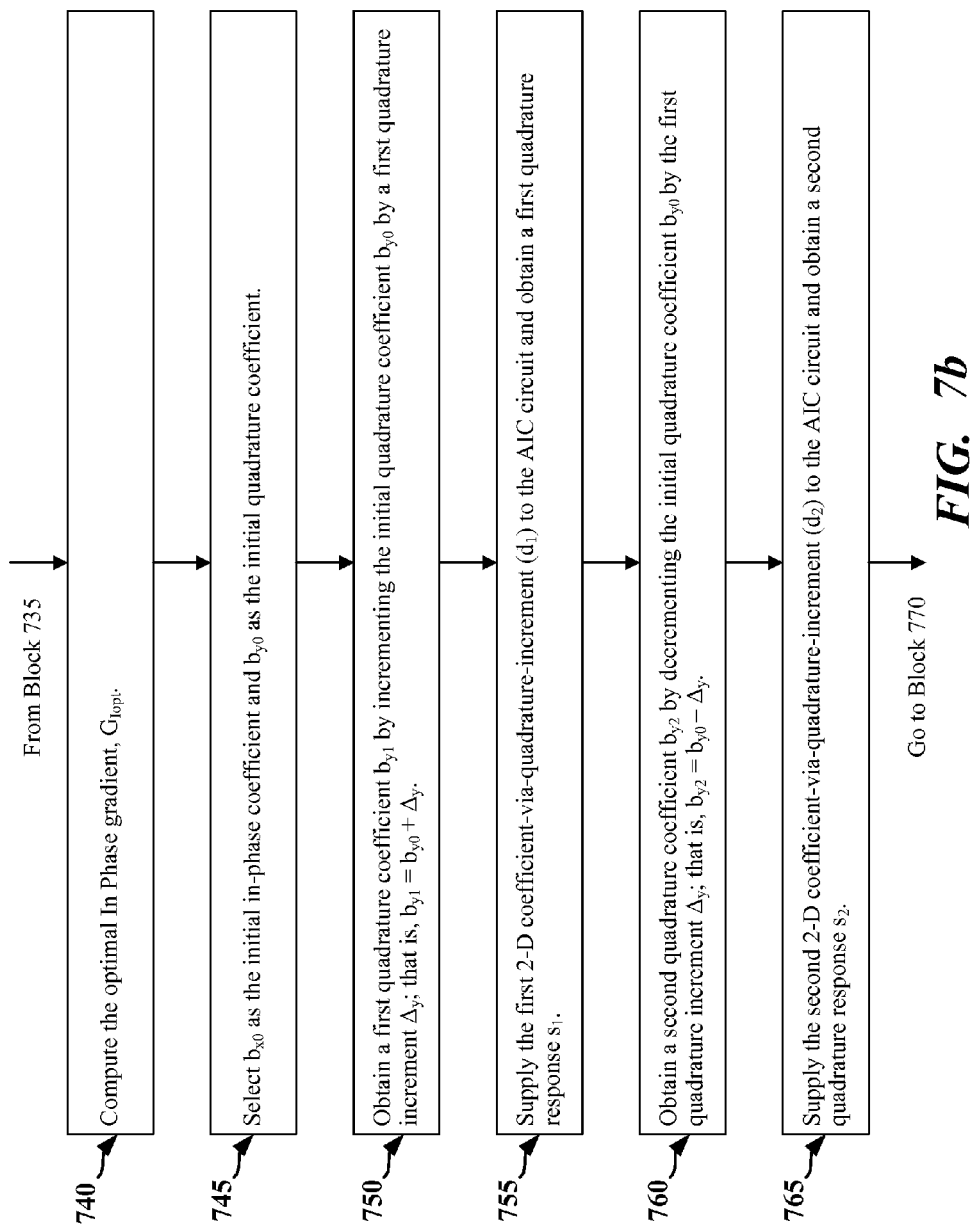
Figure 7C:
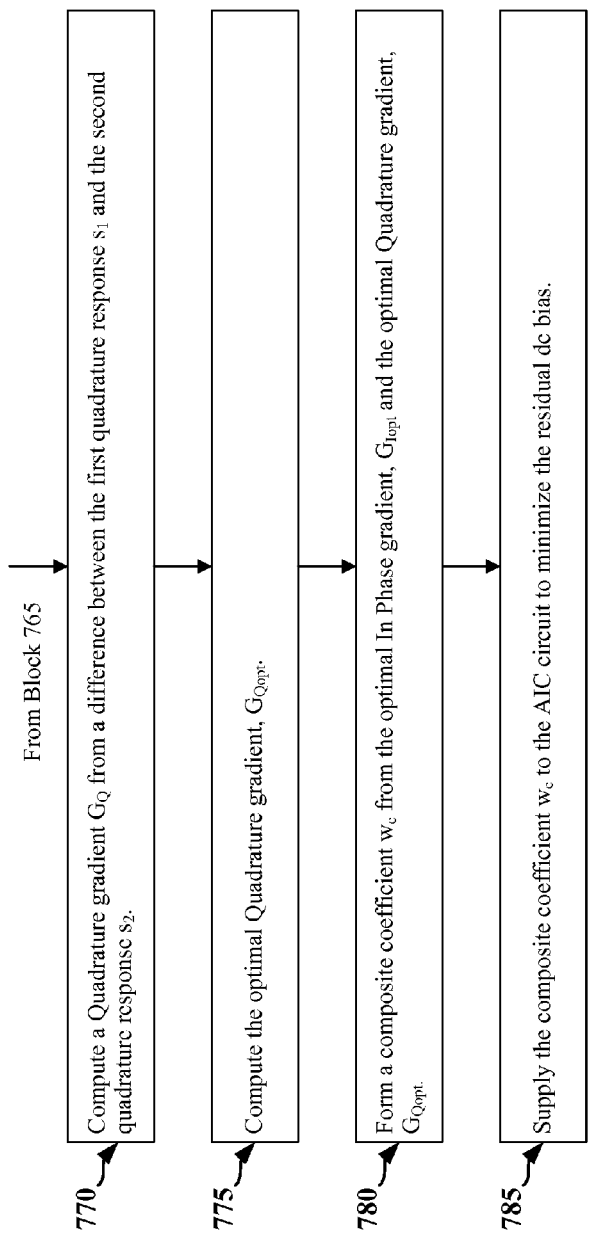

FIGS. 7a-7c illustrate a flow diagram of an example algorithm for utilizing a stochastic approximation to determine coefficients for minimizing residual dc bias while implementing interference cancellation in a receiver. In various aspects, a coefficient computation algorithm uses a first digital signal component x(n) and a second digital signal component y(n) as inputs. The coefficient computation algorithm utilizing stochastic approximation produces a first baseband coefficient $b_x$ and a second baseband coefficient $b_y$ as outputs. The first digital signal component x(n) is referred to as an in-phase signal component and the second digital signal component y(n) is referred to as a quadrature signal component. Correspondingly, the first baseband coefficient $b_x$ is referred to as an in-phase coefficient and the second baseband coefficient $b_y$ is referred to as a quadrature coefficient. In various examples, the coefficient computation algorithm utilizing stochastic approximation resides within the algorithm engine 434 (shown in FIG. 4).

Fix the Quadrature Component and Increment the In-Phase Component Utilizing Stochastic Approximation In block 710, set a coefficient to an initial coefficient $c_0$ with an in-phase component and a quadrature component. The initial coefficient $c_0$ may be represented as ($b_{x0}$, $b_{y0}$), where $b_{x0}$ is the initial in-phase coefficient and $b_{y0}$ is the initial quadrature coefficient. Although the example is presented with in-phase and quadrature coefficients, it may be generalized to any two dimensions, i.e., to a first dimension and a second dimension.

In block 715, obtain a first in-phase coefficient $b_{x1}$ by incrementing the initial in-phase coefficient $b_{x0}$ by a first in-phase increment $\Delta_x$; that is, $b_{x1}=b_{x0}+\Delta_x$. Thus, a first 2-D coefficient-via-in-phase-increment ($c_1$) is represented as ($b_{x1}$, $b_{y0}$). In block 720, supply the first 2-D coefficient-via-in-phase-increment ($c_1$) to the AIC circuit 416 and obtain a first in-phase response $r_1$.

In block 725, obtain a second in-phase coefficient $b_{x2}$ by decrementing the initial in-phase coefficient $b_{x0}$ by the first in-phase increment $\Delta_x$; that is, $b_{x2}=b_{x0}-\Delta$. Thus, a second 2-D coefficient-via-in-phase-increment ($c_2$) is represented as ($b_{x2}$, $b_{y0}$). In block 730, supply the second 2-D coefficient-via-in-phase-increment ($c_2$) to the AIC circuit 416 and obtain a second in-phase response $r_2$. In block 735, compute an in-phase gradient $G_I$ from a difference between the first in-phase response $r_1$ and the second in-phase response $r_2$. In various examples, $$G_1=(r_1-r_2)/(2\Delta_x) \qquad \text{eqn (5)}$$

In block 740, compute the optimal in-phase gradient, $G_{Iopt}$. Although not shown here, further updating of the in-phase gradient $G_1$ may be performed by incrementing and decrementing the first and the second 2-D coefficients-via-in-phase-increment ($c_1$, $c_2$) by $\Delta_x$ and repeating the blocks of 715-735 until the in-phase gradient $G_I$ is less than a gradient threshold $G_0$. Refer to the first in-phase gradient $G_I$ from the iteration that is less than the gradient threshold $G_0$ as the optimal in-phase gradient, $G_{Iopt}$. The first in-phase increment $\Delta_x$ may be either a positive or a negative value.

Fix the In-Phase Component and Increment the Quadrature Component Utilizing Stochastic Approximation In block 745, select $b_{x0}$ as the initial in-phase coefficient and $b_{y0}$ as the initial quadrature coefficient. In block 750, obtain a first quadrature coefficient $b_{y1}$ by incrementing the initial quadrature coefficient $b_{y0}$ by a first quadrature increment $\Delta_y$; that is, $b_{y1}=b_{y0}+\Delta_y$. Thus, a first 2-D coefficient-via-quadrature-increment ($d_1$) is represented as ($b_{x0}$, $b_{y1}$). In block 755, supply the first 2-D coefficient-via-quadrature-increment ($d_1$) to the AIC circuit 416 and obtain a first quadrature response $s_1$.

In block 760 obtain a second quadrature coefficient $b_{y2}$ by decrementing the initial quadrature coefficient $b_{y0}$ by the first quadrature increment $\Delta_y$; that is, $b_{y2}=b_{y0}-\Delta_y$. Thus, a second 2-D coefficient-via-quadrature-increment ($d_2$) is represented as ($b_{x0}$, $b_{y2}$). In block 765, supply the second 2-D coefficient-via-quadrature-increment ($d_2$) to the AIC circuit 416 and obtain a second quadrature response $s_2$. In block 770, compute a quadrature gradient $G_Q$ from a difference between the first quadrature response $s_1$ and the second quadrature response $s_2$. In various examples, $$G_Q=(s_1-s_2)/(2\Delta_y) \qquad \text{eqn (6)}$$

In block 775, compute the optimal quadrature gradient, $G_{Qopt}$. Although not shown here, further updating of the quadrature gradient $G_Q$ may be performed by incrementing and decrementing the first and the second 2-D coefficients-via-quadrature-increment ($d_1$, $d_2$) by $\Delta_y$, and repeating the blocks of 750-770 until the quadrature gradient $G_Q$ is also less than the gradient threshold $G_0$. Refer to the first quadrature gradient $G_Q$ from the iteration that is less than the gradient threshold $G_0$ as the optimal quadrature gradient, $G_{Qopt}$. The first quadrature increment $\Delta_y$ may be either a positive or a negative value.

Form a Composite Coefficient

In block 780, form a composite coefficient $w_c$ from the optimal in-phase gradient, $G_{Iopt}$ and the optimal quadrature gradient, $G_{Qopt}$.

$$w_c = c_0 - [G_{Iopt} + G_{Qopt}] * \Delta_w. \qquad \text{eqn (7)}$$

In various examples, the coefficient increment $\Delta_w$ equals the first in-phase increment $\Delta_x$ or the first quadrature increment $\Delta_y$.

In block 785, supply the composite coefficient $w_c$ to the AIC circuit 416 to minimize the residual dc bias. In various aspects, the in-phase and quadrature coefficients are updated separately.

Figure 8A:
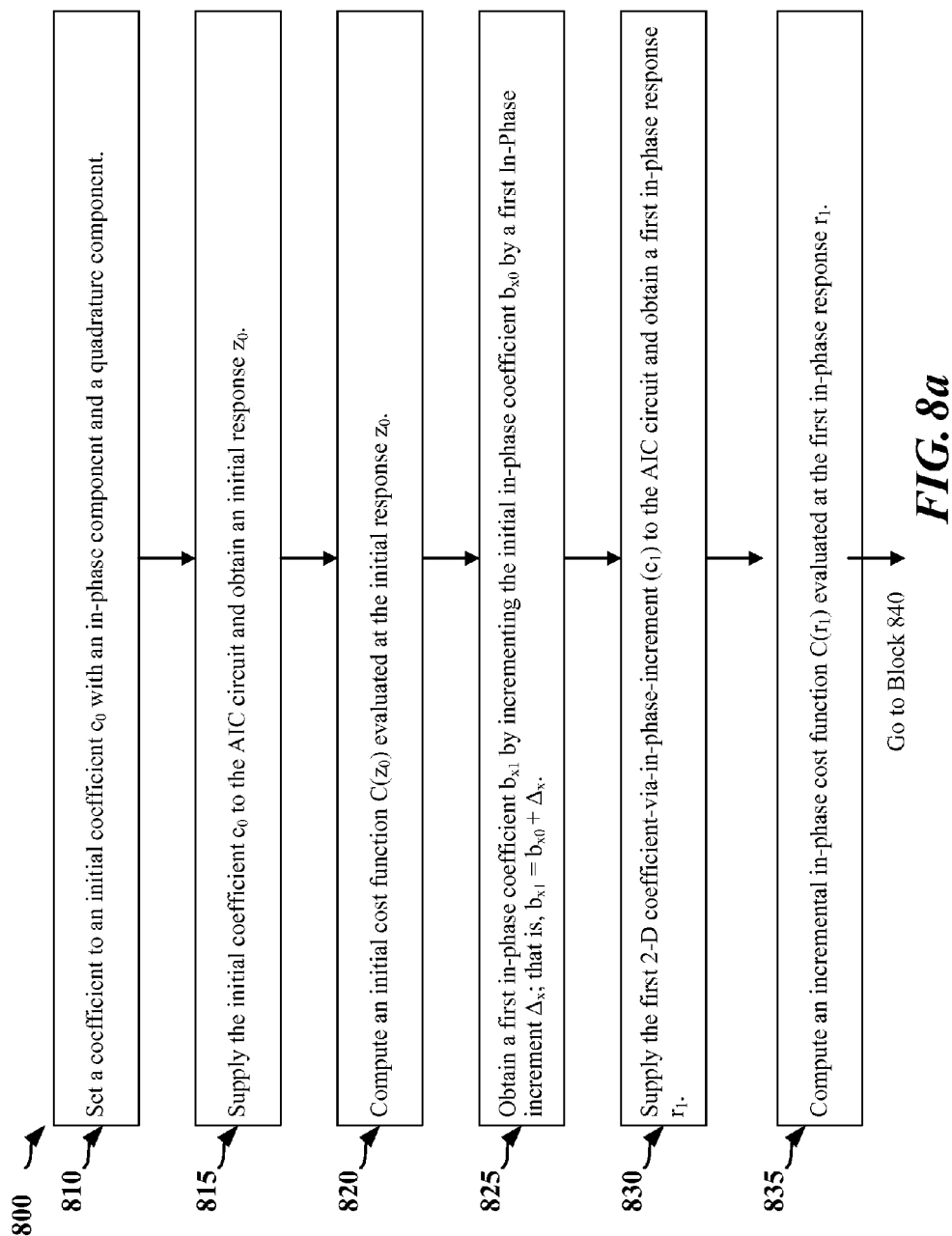
FIGS. 8a-8c illustrate a flow diagram of an example algorithm for utilizing a simplified stochastic approximation to determine coefficients for minimizing residual dc bias while implementing interference cancellation in a receiver.
Figure 8B:
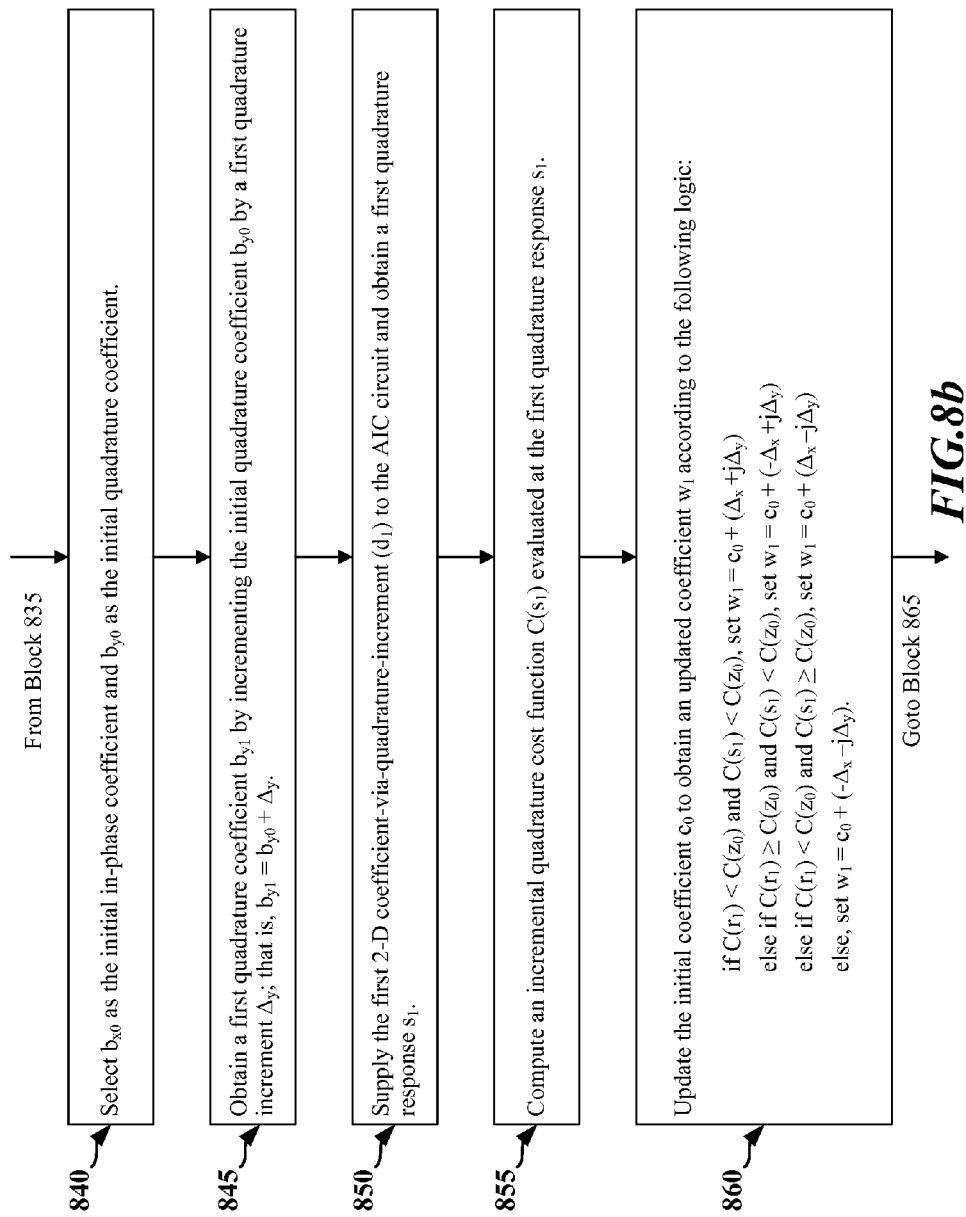
Figure 8C:
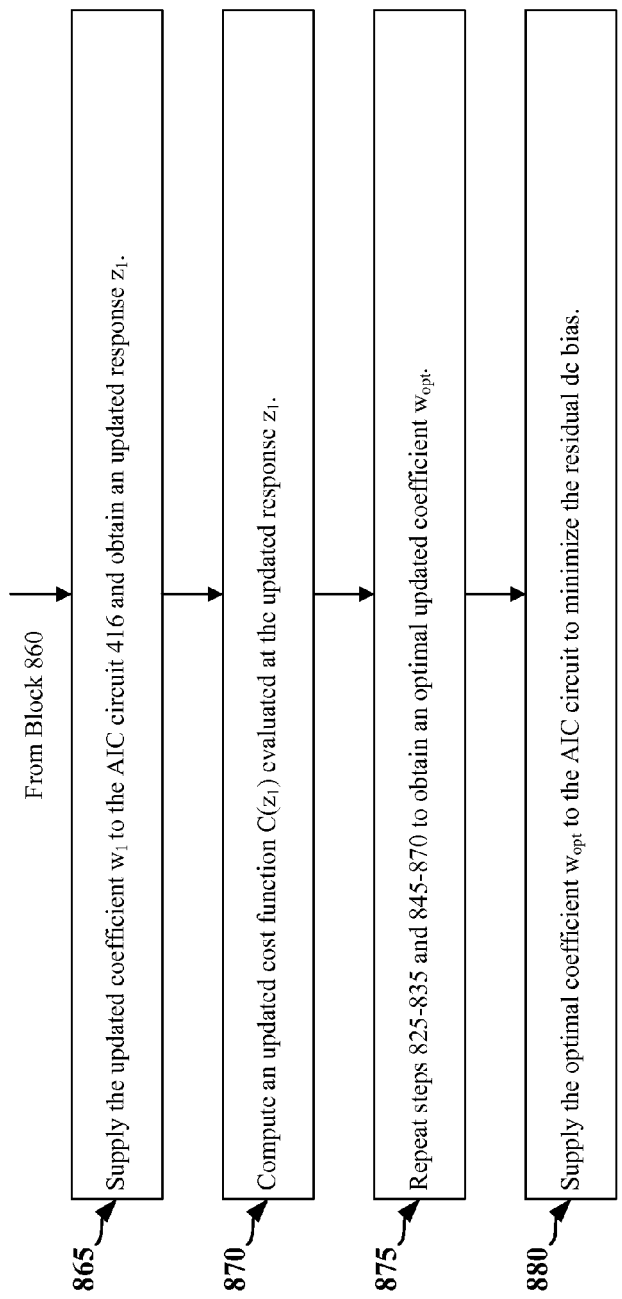

FIGS. 8a-8c illustrate a flow diagram of an example algorithm for utilizing a simplified stochastic approximation to determine coefficients for minimizing residual dc bias while implementing interference cancellation in a receiver. In various aspects, a coefficient computation algorithm uses a first digital signal component $x(n)$ and a second digital signal component $y(n)$ as inputs. The coefficient computation algorithm utilizing the simplified stochastic approximation produces a first baseband coefficient $b_x$ and a second baseband coefficient $b_y$ as outputs. The first digital signal component $x(n)$ is referred to as an in-phase signal component and the second digital signal component $y(n)$ is referred to as a quadrature signal component. Correspondingly, the first baseband coefficient $b_x$ is referred to as an in-phase coefficient and the second baseband coefficient $b_y$ is referred to as a quadrature coefficient. In various examples, the coefficient computation algorithm utilizing the simplified stochastic approximation resides within the algorithm engine 434 (shown in FIG. 4).

Compute Initial Cost Function $C(z_0)$

In block 810, set a coefficient to an initial coefficient $c_0$ with an in-phase component and a quadrature component. The initial coefficient $c_0$ may be represented as ($b_{x0}$, $b_{y0}$), where $b_{x0}$ is the initial in-phase coefficient and $b_{y0}$ is the initial quadrature coefficient. Although the example is presented with in-phase and quadrature coefficients, it may be generalized to any two dimensions, i.e., to a first dimension and a second dimension. In block 815, supply the initial coefficient $c_0$ to the AIC circuit 416 and obtain an initial response $z_0$. In block 820, compute an initial cost function $C(z_0)$ evaluated at the initial response $z_0$. In various examples, the initial response $z_0$ is obtained either as a sample average or as a moving average. The initial cost function $C(z_0)$ corresponds to the initial coefficient $c_0$.

Fix the Quadrature Component and Increment the In-Phase Component Utilizing Simplified Stochastic Approximation In block 825, obtain a first in-phase coefficient $b_{x1}$ by incrementing the initial in-phase coefficient $b_{x0}$ by a first in-phase increment $\Delta_x$; that is, $b_{x1} = b_{x0} + \Delta_x$. Thus, a first 2-D coefficient-via-in-phase-increment ($c_1$) is represented as ($b_{x1}$, $b_{y0}$). In block 830, supply the first 2-D coefficient-via-in-phase-increment ($c_1$) to the AIC circuit 416 and obtain a first in-phase response $r_1$. In block 835, compute an incremental in-phase cost function $C(r_1)$ evaluated at the first in-phase response $r_1$. In various examples, the first in-phase response $r_1$ is obtained either as a sample average or as a moving average. The incremental in-phase cost function $C(r_1)$ corresponds to the first 2-D coefficient-via-in-phase-increment ($c_1$). The first in-phase increment $\Delta_x$ may be either a positive or a negative value.

Fix the In-Phase Component and Increment the Quadrature Component Utilizing Simplified Stochastic Approximation In block 840, select $b_{x0}$ as the initial in-phase coefficient and $b_{y0}$ as the initial quadrature coefficient. In block 845, obtain a first quadrature coefficient $b_{y1}$ by incrementing the initial quadrature coefficient $b_{y0}$ by a first quadrature increment $\Delta_y$; that is, $b_{y1} = b_{y0} + \Delta_y$. Thus, a first 2-D coefficient-via-quadrature-increment ($d_1$) is represented as ($b_{x0}$, $b_{y1}$). In block 850, supply the first 2-D coefficient-via-quadrature-increment ($d_1$) to the AIC circuit 416 and obtain a first quadrature response $s_1$. In block 855, compute an incremental quadrature cost function $C(s_1)$ evaluated at the first quadrature response $s_1$. In various examples, the first quadrature response $s_1$ is obtained either as a sample average or as a moving average. The incremental quadrature cost function $C(s_1)$ corresponds to the first 2-D coefficient-via-quadrature-increment ($d_1$). The first quadrature increment $\Delta_y$ may be either a positive or a negative value.

Updating the Coefficients

In block 860, update the initial coefficient $c_0$ to obtain an updated coefficient $w_1$ according to the following logic:

if $C(r_1) < C(z_0)$ and $C(s_1) < C(z_0)$, set $w_1 = c_0 + (\Delta_x + j\Delta_y)$ else if $C(r_1) \geq C(z_0)$ and $C(s_1) < C(z_0)$, set $w_1 = c_0 + (-\Delta_x + j\Delta_y)$ else if $C(r_1) < C(z_0)$ and $C(s_1) \geq C(z_0)$, set $w_1 = c_0 + (\Delta_x - j\Delta_y)$ else, set $w_1 = c_0 + (-\Delta_x - j\Delta_y)$.

In block 865, supply the updated coefficient $w_1$ to the AIC circuit 416 and obtain an updated response $z_1$. In block 870, compute an updated cost function $C(z_1)$ evaluated at the updated response $z_1$. In various examples, the updated response $z_1$ is obtained either as a sample average or as a moving average. The updated cost function $C(z_1)$ corresponds to the updated coefficient $w_1$.

In block 875, repeat blocks 825-835 and 845-870 to obtain an optimal updated coefficient $w_{opt}$. The optimal updated coefficient $w_{opt}$ corresponds to an optimal cost function, where the optimal cost function is a cost function that is less than a cost function threshold $C_{threshold}$. One would understand that values of the cost function threshold $C_{threshold}$ may depend on one or more of the following: analog to digital converter (ADC 432) quantization level, thermal noise at ADC 432, interference at ADC 432, the presence of the desired signal, etc.

In block 880, supply the optimal coefficient $w_{opt}$ to the AIC circuit to minimize the residual dc bias. In various aspects, the in-phase and quadrature coefficients are updated separately.

Figure 9A:
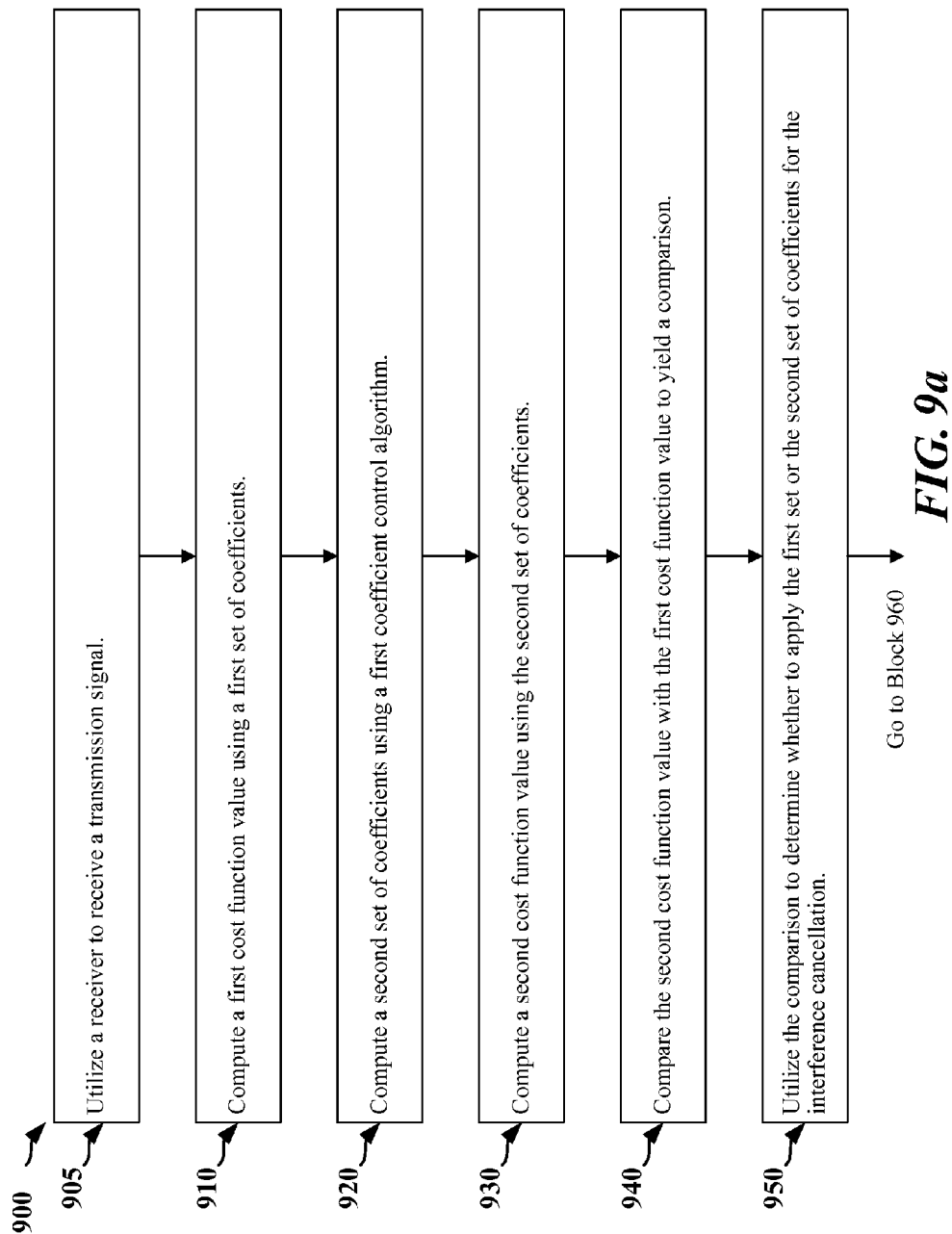
FIGS. 9a-9b illustrate a flow diagram of a method for interference cancellation.
Figure 9B:
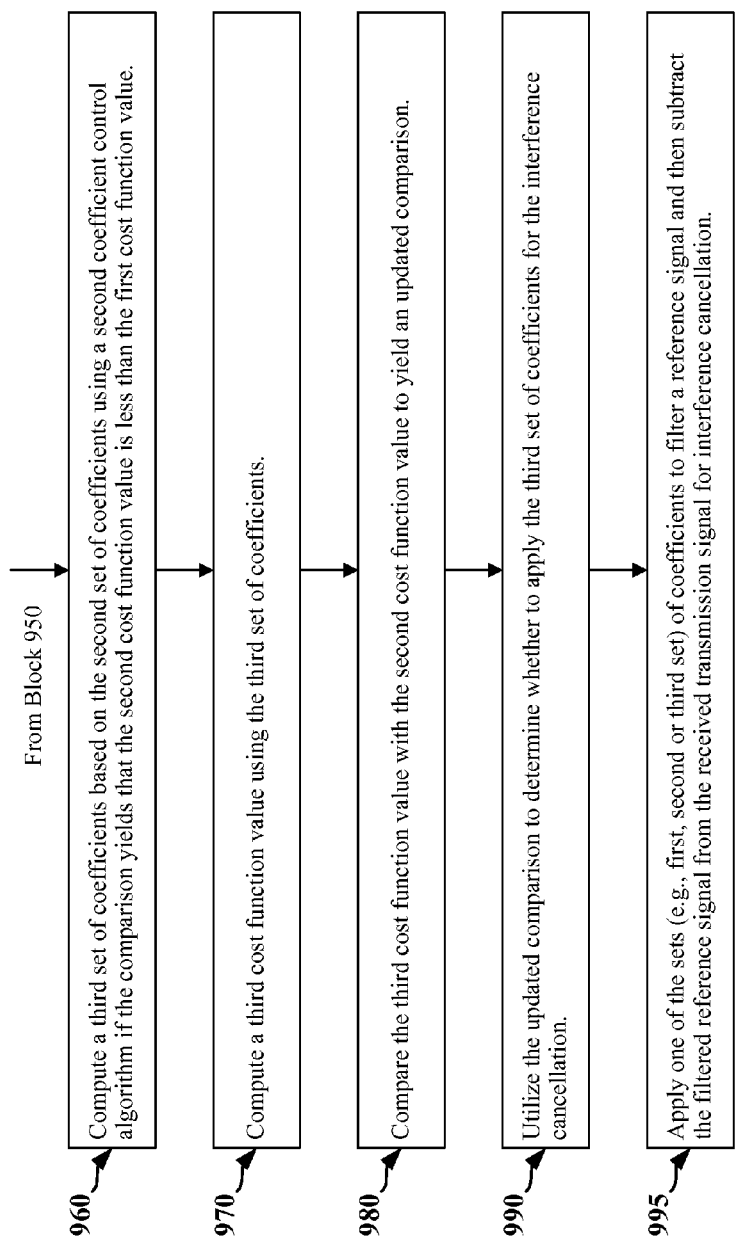

FIGS. 9a-9b illustrate a flow diagram of a method for interference cancellation. The method may be performed by a device having one or more transmitters and one or more receivers. In various examples, the one or more transmitters and receivers both operate in accordance with the same radio access technology (RAT). In another example, the device is configured to transmit signals in accordance with a first RAT while receiving signals transmitted in accordance with a second RAT. In block 905, the device may receive a transmission signal. In various aspects, a receiver (e.g., receiver 420 shown in FIG. 4) is used to receive the transmission signal. In various examples, the receiver may be coupled to at least one processor configured to perform the steps in one or more blocks 910 through 990. In block 910, the device may compute a first cost function value utilizing a first set of coefficients. In various aspects, the device may use the cost function computation module 505 (shown in FIG. 5) to compute the first cost function value. In various examples, the first set of coefficients are stored values, for example, stored in a memory that is part of the device.

In block 920, the device may compute a second set of coefficients utilizing a first coefficient control algorithm. In various examples, the first coefficient control algorithm is one of the following: a voltage sweeping algorithm, a stochastic approximation algorithm, a simplified stochastic approximation algorithm. In various aspects, the device includes a coefficient computation module 555 to compute the second set of coefficients, wherein the coefficient computation module 555 may include one or more of the following modules: voltage sweeping module 540, simplified stochastic approximation module 550 or stochastic approximation module 560 (shown in FIG. 5). In various examples, the coefficient computation module 555 may include other module(s) for other coefficient computation algorithm(s). A predefined condition may enable the first coefficient control algorithm for usage. In various examples, the predefined condition is a received signal strength indication (RSSI) being greater than a RSSI threshold, and the RSSI is associated with the first cost function value. If the difference between the RSSI and a previous RSSI is greater than a predetermined value, the RSSI is associated with the first cost function value. In various examples, the predetermined value may be based on thermal noise level, interference level and/or propagation conditions, etc. In various examples, the first set of coefficients and the second set of coefficients are represented by in-phase and quadrature components.

In block 930, the device may compute a second cost function value utilizing the second set of coefficients. For example, the device may compute the second cost function value based on a moving average or on a sample average of a plurality of samples resulting from the applied second set of coefficients. In various examples, the device may compute the first cost function value and the second cost function value based on respective mean square errors. In various aspects, the device may use the cost function computation module 505 (shown in FIG. 5) to compute the second cost function value.

In block 940, the device may compare the second cost function value with the first cost function value to yield a comparison. In various aspects, the device may use the cost function comparison module 520 (shown in FIG. 5) to compare the second cost function value with the first cost function value.

In block 950, the device may use the comparison to determine whether to apply the first set or the second set of coefficients for the interference cancellation. For example, if the comparison indicates that the second cost function value is less than the first cost function value, the second set of coefficients is applied for the interference cancellation. In various aspects, the device may use the coefficient computation algorithm selection module 530 (shown in FIG. 5) to determine whether to apply the first set or the second set of coefficients for the interference cancellation.

In block 960, the device may continue to compute a third set of coefficients based on the second set of coefficients utilizing a second coefficient control algorithm if the comparison yields that the second cost function value is less than the first cost function value. The second coefficient control algorithm may be the same as the first coefficient control algorithm. For example, the algorithms may be one of the following: a voltage sweeping algorithm, a stochastic approximation algorithm, a simplified stochastic approximation algorithm. In another example, the second coefficient control algorithm is different from the first coefficient control algorithm. In various examples, the first coefficient control algorithm and the second coefficient control algorithm are each one of the following: a voltage sweeping algorithm, a stochastic approximation algorithm, a simplified stochastic approximation algorithm. And, the device may use the coefficient computation module 555 to compute the third set of coefficients. Or, the device may use the corresponding module(s)—voltage sweeping module 540, simplified stochastic approximation module 550 or stochastic approximation module 560 (shown in FIG. 5)—to compute the third set of coefficients.

In block 970, the device may compute a third cost function value utilizing the third set of coefficients. In various aspects, the device may use the cost function computation module 505 (shown in FIG. 5) to compute the third cost function value. In block 980, the device may compare the third cost function value with the second cost function value to yield an updated comparison. In various aspects, the device may use the cost function comparison module 520 (shown in FIG. 5) to compare the third cost function value with the second cost function value.

In block 990, the device may use the updated comparison to determine whether to apply the third set of coefficients for the interference cancellation. In various aspects, the device may use the coefficient computation algorithm selection module 530 (shown in FIG. 5) to determine whether to apply the third set of coefficients for the interference cancellation. In various examples, the device may repeat the blocks of 960 through 990 for yet one or more sets of coefficients and cost function values. In various aspects, the blocks 910 through 990 may be performed by the coefficient controller 450, and the coefficient controller 450 may be coupled to at least one processor configured to perform the steps in blocks 910 through 990.

In block 995, the device (e.g., using the AIC circuit 416) may apply one of the sets (e.g., first set, second set, third set, etc.) of coefficients to filter a reference signal and then subtract (e.g., using the receiver 420) the filtered reference signal from the received transmission signal for interference cancellation. In various examples, the set of coefficients is inputted into the AIC circuit 416 to modify the frequency response of the AIC circuit 416 which filters the reference signal inputted to the AIC circuit 416. A filtered reference signal is then outputted from the AIC circuit 416 to the adder 422 (shown in FIG. 4). At the adder 422, the filtered reference signal is subtracted from the received transmission signal (from block 905), resulting in interference cancellation.

Figure 10:
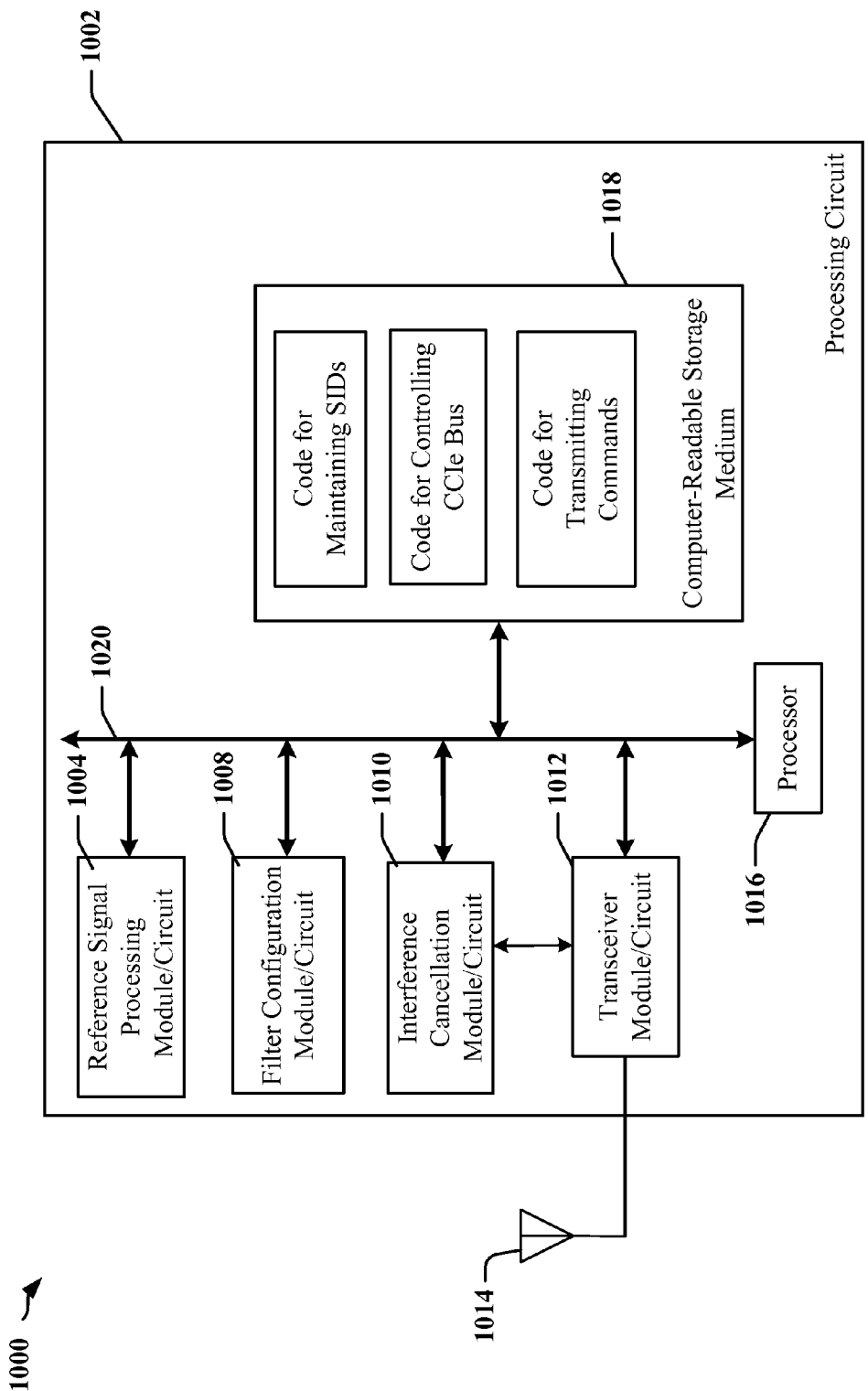
FIG. 10 is a diagram illustrating an example of a hardware implementation for an apparatus employing a processing employing a processing circuit adapted according to certain aspects disclosed herein.

FIG. 10 is a diagram illustrating a simplified example of a hardware implementation for an apparatus 1000 employing a processing circuit 1002. The processing circuit typically has a processor 1016 that may include one or more of a microprocessor, microcontroller, digital signal processor, a sequencer and a state machine. The processing circuit 1002 may be implemented with a bus architecture, represented generally by the bus 1020. The bus 1020 may include any number of interconnecting buses and bridges depending on the specific application of the processing circuit 1002 and the overall design constraints. The bus 1020 links together various circuits including one or more processors and/or hardware modules, represented by the processor 1016, the modules or circuits 1004 and 1008, transceiver circuits 1012 configurable to communicate over the one or more antennas 1014 and the computer-readable storage medium 1018. The bus 1020 may also link various other circuits such as timing sources, peripherals, voltage regulators, and power management circuits, which are well known in the art, and therefore, will not be described any further.

The processor 1016 is responsible for general processing, including the execution of software stored on the computer-readable storage medium 1018. In various examples, the computer-readable storage medium stores computer executable code operable on a device. The software, when executed by the processor 1016, causes the processing circuit 1002 to perform the various functions described supra for any particular apparatus. The computer-readable storage medium 1018 may also be used for storing data that is manipulated by the processor 1016 when executing software, including data transmitted or received in RF signals transmitted over the one or more antennas 1014, which may be configured as data lanes and clock lanes. The processing circuit 1002 further includes at least one of the modules 1004 and 1008. The modules 1004 and 1008 may be software modules running in the processor 1016, resident/stored in the computer-readable storage medium 1018, one or more hardware modules coupled to the processor 1016, or some combination thereof. The modules 1004 and/or 1008 may include microcontroller instructions, state machine configuration parameters, or some combination thereof.

In one configuration, the apparatus 1000 for wireless communication includes a module and/or circuit 1004 that is configured to receive and process a reference signal representative of an interfering signal transmitted by apparatus 1000, a module and/or circuit 1008 configured to configure a filter utilizing RF, baseband or digital feedback, and a module and/or circuit 1010 configured to cancel interference in the RF signal. Although it is shown in FIG. 10 that the modules/circuits (e.g., 1004, 1008, 1010, 1012, 1018) are external to processor 1016, one would understand that one or more of these modules/circuits may reside within the processor 1016.

Figure 11:
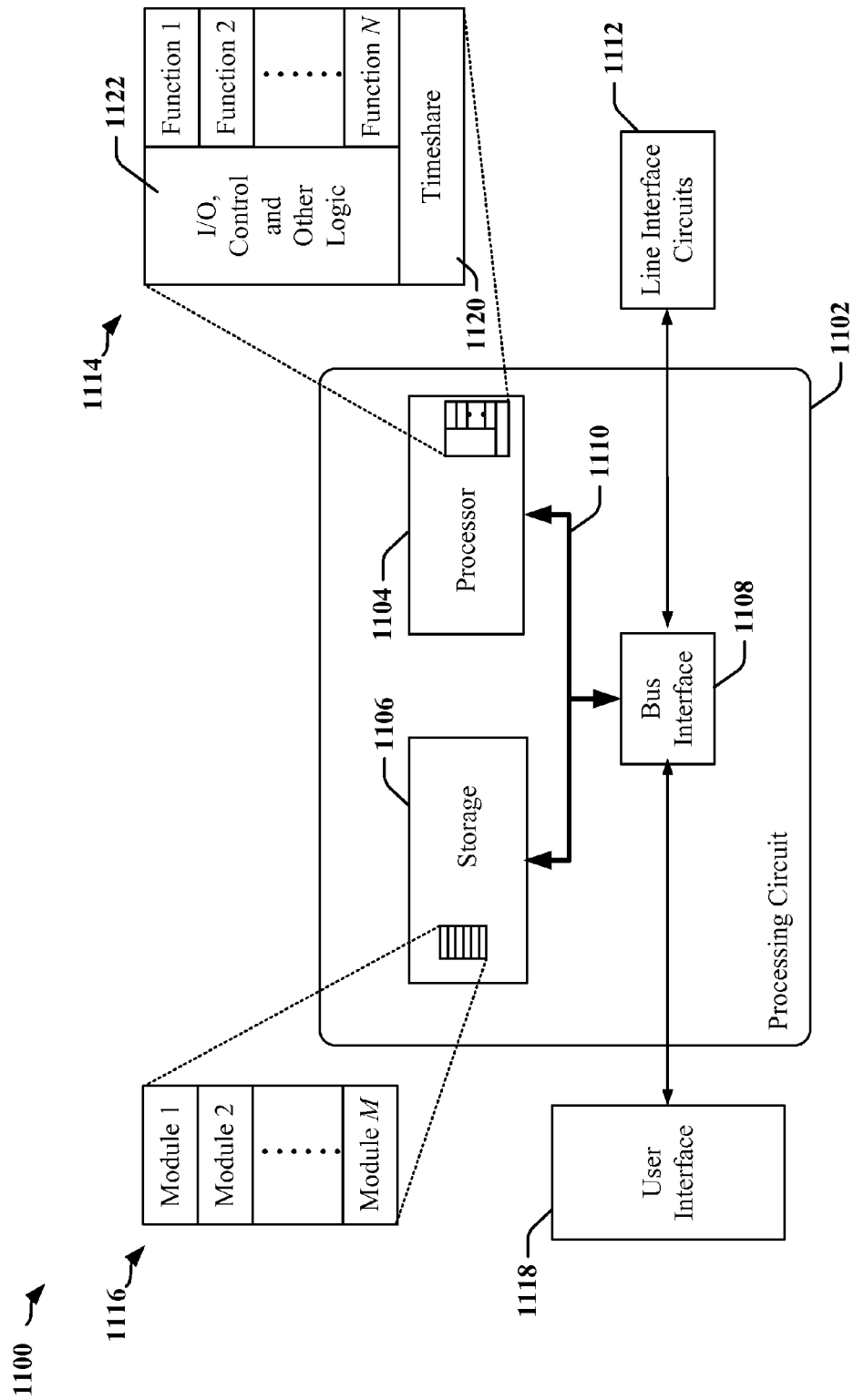
FIG. 11 is a block diagram illustrating an example of an apparatus employing a processing circuit that may be adapted according to certain aspects disclosed herein.

FIG. 11 is a conceptual diagram 1100 illustrating a simplified example of a hardware implementation for an apparatus employing a processing circuit 1102 that may be configured to perform one or more functions disclosed herein. In accordance with various aspects of the disclosure, an element, or any portion of an element, or any combination of elements as disclosed herein may be implemented utilizing the processing circuit 1102. The processing circuit 1102 may include one or more processors 1104 that are controlled by some combination of hardware and software modules. Examples of processors 1104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable storage media and/or processor-readable storage media. The bus 1110 may also link various other circuits such as timing sources, timers, peripherals, voltage regulators, and power management circuits. A bus interface 1108 may provide an interface between the bus 1110 and one or more transceivers 1112. A transceiver 1112 may be provided for each networking technology supported by the processing circuit. In some instances, multiple networking technologies may share some or all of the circuitry or processing modules found in a transceiver 1112. Each transceiver 1112 provides a means for communicating with various other apparatus over a transmission medium. Depending upon the nature of the apparatus, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable storage medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable storage medium. The external computer-readable storage medium and/or storage 1106 may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium and/or storage 1106 may also include, by way of example, a carrier wave, a transmission line, and any other suitable medium for transmitting software and/or instructions that may be accessed and read by a computer. Computer-readable storage medium and/or the storage 1106 may reside in the processing circuit 1102, in the processor 1104, external to the processing circuit 1102, or be distributed across multiple entities including the processing circuit 1102. The computer-readable storage medium and/or storage 1106 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In various examples, the multitasking environment may be implemented utilizing a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Additionally, the components described in FIGS. 10 and 11 may be implemented to perform some or all the blocks of the flow diagrams in FIGS. 6-9. Several aspects of a telecommunications system have been presented. As those skilled in the art will readily appreciate, various aspects described throughout this disclosure may be extended to various types of telecommunication systems, network architectures and communication standards.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is not directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features and/or functions illustrated in the figures may be rearranged and/or combined into a single component, block, feature or function or embodied in several components, blocks, or functions. Additional elements, components, blocks, and/or functions may also be added without departing from novel features disclosed herein. The apparatus, devices, and/or components illustrated in the various drawings may be configured to perform one or more of the methods, features, or blocks described herein. The novel algorithms described herein may also be efficiently implemented in software and/or embedded in hardware.

It is to be understood that the specific order or hierarchy of blocks in the methods disclosed is an illustration of exemplary processes. Based upon design preferences, it is understood that the specific order or hierarchy of blocks in the methods may be rearranged. The accompanying method claims present elements of the various blocks in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited utilizing the phrase "means for" or, in the case of a method claim, the element is recited utilizing the phrase "step for."

What is claimed is:

1. A method for interference cancellation, comprising:
   utilizing a receiver to receive a transmission signal;
   computing a first cost function value utilizing a first set of coefficients;
   computing a second set of coefficients utilizing a first coefficient control algorithm;
   computing a second cost function value utilizing the second set of coefficients;
   comparing the second cost function value with the first cost function value to yield a comparison;
   utilizing the comparison to determine whether to apply the first set or the second set of coefficients for the interference cancellation; and
   applying one of the first set or the second set of coefficients to filter a reference signal and subtracting the filtered reference signal from the received transmission signal for the interference cancellation.

2. The method of claim 1, wherein the first coefficient control algorithm is one of the following: a voltage sweeping algorithm, a stochastic approximation algorithm, or a simplified stochastic approximation algorithm.

3. The method of claim 1, wherein a predefined condition enables the first coefficient control algorithm for usage.

4. The method of claim 3, wherein the predefined condition is a received signal strength indication (RSSI) being greater than a RSSI threshold, wherein the RSSI is associated with the first cost function value.

5. The method of claim 1, further comprising applying the second set of coefficients for the interference cancellation if the comparison indicates that the second cost function value is less than the first cost function value.

6. The method of claim 1, further comprising computing a third set of coefficients based on the second set of coefficients utilizing a second coefficient control algorithm if the comparison yields that the second cost function value is less than the first cost function value.

7. The method of claim 6, further comprising:
   computing a third cost function value utilizing the third set of coefficients;
   comparing the third cost function value with the second cost function value to yield a updated comparison; and
   utilizing the updated comparison to determine whether to apply the third set of coefficients for the interference cancellation.

8. The method of claim 6, wherein the second coefficient control algorithm is the same as the first coefficient control algorithm; and wherein the first coefficient control algorithm is one of the following: a voltage sweeping algorithm, a stochastic approximation algorithm, or a simplified stochastic approximation algorithm.

9. The method of claim 6, wherein the second coefficient control algorithm is different from the first coefficient control algorithm; and wherein the first coefficient control algorithm and the second coefficient control algorithm include two of the following: a voltage sweeping algorithm, a stochastic approximation algorithm, or a simplified stochastic approximation algorithm.

10. The method of claim 1, wherein the computing the second cost function value is based on a moving average or a sample average of a plurality of samples resulting from the applied second set of coefficients.

11. The method of claim 1, wherein the first set of coefficients and the second set of coefficients are represented by in-phase and quadrature components.

12. The method of claim 1, wherein the computing the first cost function value is based on a first mean square error, and the computing the second cost function value is based on a second mean square error.

13. An apparatus for interference cancellation, comprising:
   at least one processor;
   a memory for storing a first set of coefficients, the memory coupled to the at least one processor;
   a receiver coupled to the at least one processor, the receiver configured for receiving a transmission signal;
   a coefficient controller coupled to the at least one processor configured for performing the following:
      computing a first cost function value utilizing the first set of coefficients;
      computing a second set of coefficients utilizing a first coefficient control algorithm;
      computing a second cost function value utilizing the second set of coefficients;
      comparing the second cost function value with the first cost function value to yield a comparison; and
      utilizing the comparison to determine whether to apply the first set or the second set of coefficients for the interference cancellation; and
   an analog interference cancellation (AIC) circuit for applying one of the first set or the second set of coefficients to filter a reference signal, and wherein the receiver subtracts the filtered reference signal from the received transmission signal for the interference cancellation.

14. The apparatus of claim 13, wherein a predefined condition enables the first coefficient control algorithm for usage, and wherein the predefined condition is a received signal strength indication (RSSI) being greater than a RSSI threshold and the RSSI is associated with the first cost function value.

15. The apparatus of claim 13, wherein the analog interference cancellation (AIC) circuit applies the second set of coefficients for the interference cancellation if the comparison indicates that the second cost function value is less than the first cost function value.

16. The apparatus of claim 13, wherein the coefficient controller comprises a cost function computation module for computing the first cost function value and the second cost function value, a coefficient computation module for computing the second set of coefficients, a cost function comparison module for comparing the second cost function value with the first cost function value, and a coefficient computation algorithm selection module for utilizing the comparison to determine whether to apply the first set or the second set of coefficients.

17. The apparatus of claim 16, wherein the coefficient computation module comprises at least one of the following modules: a voltage sweeping module for performing a voltage sweeping algorithm, a stochastic approximation module for performing a stochastic approximation algorithm, or a simplified stochastic approximation module for performing a simplified stochastic approximation algorithm.

18. The apparatus of claim 16, wherein the coefficient computation module computes a third set of coefficients based on the second set of coefficients utilizing a second coefficient control algorithm if the comparison yields that the second cost function value is less than the first cost function value.

19. The apparatus of claim 18, wherein:
the cost function computation module computes a third cost function value utilizing the third set of coefficients;
the cost function comparison module compares the third cost function value with the second cost function value to yield a updated comparison; and
the coefficient computation algorithm selection module utilizes the updated comparison to determine whether to apply the third set of coefficients for the interference cancellation.

20. The apparatus of claim 13, wherein the second cost function value is computed based on a moving average or a sample average of a plurality of samples resulting from the applied second set of coefficients.

21. The apparatus of claim 13, wherein the first set of coefficients and the second set of coefficients are represented by in-phase and quadrature components.

22. The apparatus of claim 13, wherein the first cost function value is computed based on a first mean square error, and the second cost function value is computed based on a second mean square error.

23. An apparatus for interference cancellation, comprising:
at least one processor;
a memory for storing a first set of coefficients, the memory coupled to the at least one processor;
a receiver coupled to the at least one processor for receiving a transmission signal;
means for computing a first cost function value utilizing the first set of coefficients;
means for computing a second set of coefficients utilizing a first coefficient control algorithm;
means for computing a second cost function value utilizing the second set of coefficients;
means for comparing the second cost function value with the first cost function value to yield a comparison;
means for utilizing the comparison to determine whether to apply the first set or the second set of coefficients for the interference cancellation; and
means for applying one of the first set or the second set of coefficients to filter a reference signal and
wherein the receiver subtracts the filtered reference signal from the received transmission signal for the interference cancellation.

24. The apparatus of claim 23, wherein a predefined condition enables the first coefficient control algorithm for usage, and wherein the predefined condition is a received signal strength indication (RSSI) being greater than a RSSI threshold and the RSSI is associated with the first cost function value.

25. The apparatus of claim 23, further comprising means for applying the second set of coefficients for the interference cancellation if the comparison indicates that the second cost function value is less than the first cost function value.

26. The apparatus of claim 23, further comprising:
means for computing a third set of coefficients based on the second set of coefficients utilizing a second coefficient control algorithm if the comparison yields that the second cost function value is less than the first cost function value;
means for computing a third cost function value utilizing the third set of coefficients;
means for comparing the third cost function value with the second cost function value to yield a updated comparison; and
means for utilizing the updated comparison to determine whether to apply the third set of coefficients for the interference cancellation.

27. The apparatus of claim 23, wherein the means for computing the second cost function value computes the second cost function value based on a moving average or a sample average of a plurality of samples resulting from the applied second set of coefficients, and the means for computing the first cost function value computes the first cost function value based on a first mean square error, and the computing the second cost function value is based on a second mean square error.

28. A non-transitory computer-readable storage medium storing computer executable code, operable on a device comprising at least one processor; a memory for storing a first set of coefficients, the memory coupled to the at least one processor; a receiver coupled to the at least one processor, wherein the receiver is configured to receive a transmission signal; and the computer executable code comprising:
instructions for causing the at least one processor to compute a first cost function value utilizing the first set of coefficients;
instructions for causing the at least one processor to compute a second set of coefficients utilizing a first coefficient control algorithm;
instructions for causing the at least one processor to compute a second cost function value utilizing the second set of coefficients;
instructions for causing the at least one processor to compare the second cost function value with the first cost function value to yield a comparison;
instructions for causing the at least one processor to utilize the comparison to determine whether to apply the first set or the second set of coefficients for interference cancellation; and
instructions for causing the at least one processor to apply one of the first set or the second set of coefficients to filter a reference signal, wherein the receiver is further configured to subtract the filtered reference signal from the received transmission signal for the interference cancellation.

29. The non-transitory computer-readable storage medium of claim 28, wherein the computer executable code further comprising instructions for causing the at least one processor to apply the second set of coefficients for the interference cancellation if the comparison indicates that the second cost function value is less than the first cost function value or to compute a third set of coefficients based on the second set of coefficients utilizing a second coefficient control algorithm if the comparison yields that the second cost function value is less than the first cost function value.

30. The non-transitory computer-readable storage medium of claim 29, wherein the computer executable code further comprising:
instructions for causing the at least one processor to compute a third cost function value utilizing the third set of coefficients;

instructions for causing the at least one processor to compare the third cost function value with the second cost function value to yield a updated comparison; and instructions for causing the at least one processor to utilize the updated comparison to determine whether to apply the third set of coefficients for the interference cancellation.

\* \* \* \* \*